United States Patent
Nakashima

(10) Patent No.: US 9,403,088 B2
(45) Date of Patent: Aug. 2, 2016

(54) METHOD OF CONTROLLING COMPUTER DEVICE, STORAGE MEDIUM, AND COMPUTER DEVICE

(75) Inventor: Shouji Nakashima, Yokohama (JP)

(73) Assignee: BANDAI NAMCO ENTERTAINMENT INC., Tokyo (JP)

( * ) Notice: Subject to any disclaimer, the term of this patent is extended or adjusted under 35 U.S.C. 154(b) by 1745 days.

(21) Appl. No.: 12/512,494

(22) Filed: Jul. 30, 2009

(65) Prior Publication Data

US 2010/0035686 A1  Feb. 11, 2010

(30) Foreign Application Priority Data

Aug. 7, 2008 (JP) .................................. 2008-204046

(51) Int. Cl.
  *A63F 13/30* (2014.01)
  *G10L 19/00* (2013.01)

(52) U.S. Cl.
  CPC ......... *A63F 13/12* (2013.01); *A63F 2300/1081* (2013.01); *A63F 2300/572* (2013.01); *A63F 2300/6045* (2013.01); *A63F 2300/64* (2013.01); *G10L 19/0018* (2013.01)

(58) Field of Classification Search
  CPC .............. A63F 2300/1081; A63F 2300/64; A63F 2300/6045; A63F 2300/60; A63F 2300/6063; A63F 2300/6072; A63F 2300/572; A63F 13/12; G10L 19/0018
  USPC ...................................................... 463/35, 36
  See application file for complete search history.

(56) References Cited

U.S. PATENT DOCUMENTS

| 6,035,273 | A  | * | 3/2000 | Spies ..................... G10L 15/07 704/235 |
| 2004/0153557 | A1 | * | 8/2004 | Shochet et al. ............... 709/229 |
| 2005/0159833 | A1 |   | 7/2005 | Giaimo et al. |
| 2006/0025214 | A1 | * | 2/2006 | Smith ............................ 463/30 |
| 2006/0025216 | A1 | * | 2/2006 | Smith ............................ 463/35 |
| 2007/0004482 | A1 | * | 1/2007 | Ando et al. ...................... 463/6 |
| 2007/0218987 | A1 | * | 9/2007 | Van Luchene et al. ......... 463/30 |
| 2007/0244704 | A1 | * | 10/2007 | Luisi ...................... A63F 13/10 704/275 |

FOREIGN PATENT DOCUMENTS

| EP | 1 255 203 A2 | 11/2002 |
| EP | 1 693 092 A2 | 8/2006 |
| JP | A-2004-336292 | 11/2004 |
| JP | A-2007-183811 | 7/2007 |
| WO | WO 2004/036807 A2 | 4/2004 |

OTHER PUBLICATIONS

Dec. 7, 2009 Search Report issued in British Patent Application No. GB0913476.8.

* cited by examiner

*Primary Examiner* — Werner Garner
(74) *Attorney, Agent, or Firm* — Oliff PLC

(57) ABSTRACT

A game device recognizes a player's voice to obtain an input voice text. The game device compares the input voice text with a statement identification keyword. The game device transmits a statement ID corresponding to the keyword with which the input voice text coincides to another game device. Each game device that participates in the game stores statement voice data in the voice of an actor corresponding to the statement ID. When the game device has received the statement ID from another game device, the game device extracts and reproduces the corresponding statement voice data.

11 Claims, 35 Drawing Sheets

"THIS IS NO. 3 . TO EACH MEMBER. I'LL BACK UP OVER."

FIG. 6
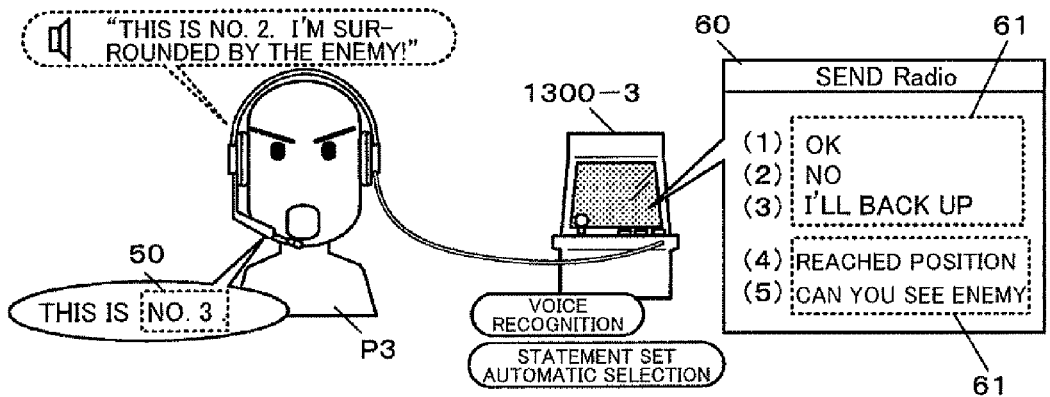
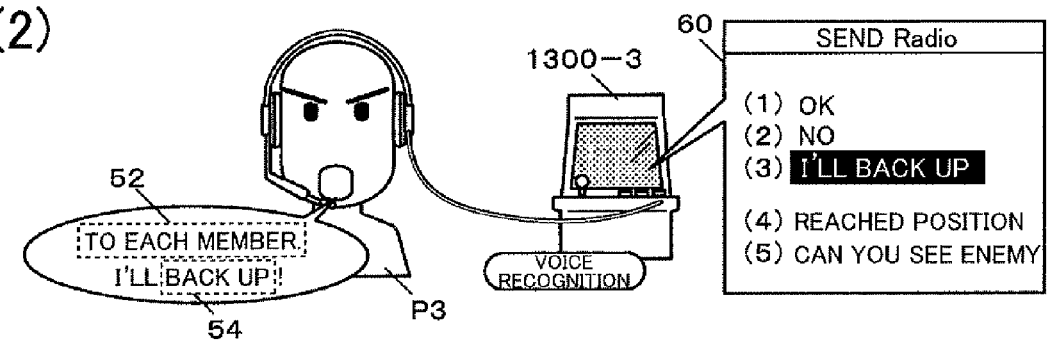
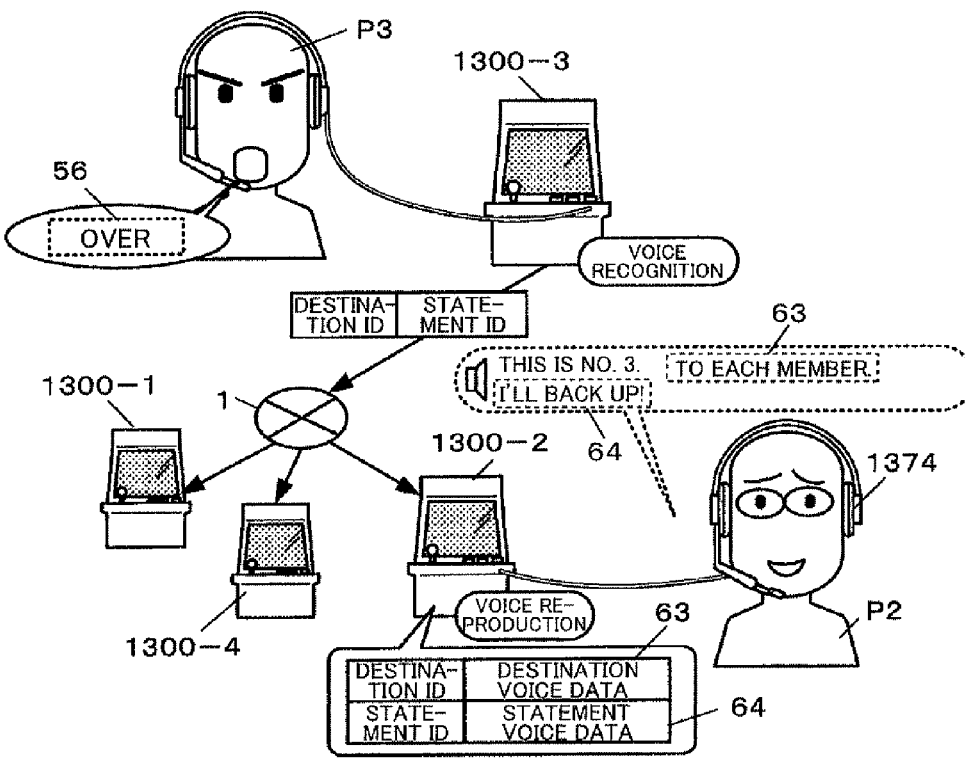

FIG. 8

- 142 — PLAYER INFORMATION
- 144 — PLAYER ID | PY0034
- 146 — HANDLE NAME | KOBUTA
- 148 — CHARACTER TYPE | CHARACTER 12
- 150 — CUMULATIVE RESULT | FOUR VICTORY ONE DEFEAT
- 152 — RANK | SERGEANT
- 154 — PLAYER HISTORY

| ANOTHER PLAYER ID | CUMULATIVE PLAY COUNT |
|---|---|
| PY1103 | 5 |
| PY0264 | 5 |
| ⋮ | ⋮ |

- 156 — OPPOSING PLAYER HISTORY

| OPPOSING PLAYER ID | CUMULATIVE PLAY COUNT |
|---|---|
| PY1322 | 2 |
| PY0887 | 2 |
| ⋮ | ⋮ |

| AREA SETTING DATA | |
|---|---|
| POSITION COORDINATES | AREA IDENTIFICATION ID |
| (X1a, Y1a)(X1b, Y1b)··· | ARE001(CENTRAL SQUARE) |
| (X2a, Y2a)(X2b, Y2b)··· | ARE002(BIG WALL WEST) |
| ⋮ | ⋮ |

FIG. 15

STATEMENT SET SELECTION CONDITION TBL (524)

- 524a: CHARACTER TYPE | CHARACTER 12

524b: SET SELECTION CONDITION / 524c: STATEMENT SET ID

| HIT POINT OF PLAYER'S CHARACTER | SITUATION INDEX | PLAY TIME | ENEMY WITHIN FIELD OF VIEW | ENEMY WITHIN ATTACK RANGE | IDENTIFI-CATION | ... | STATEMENT SET ID |
|---|---|---|---|---|---|---|---|
| — | — | — | — | — | NO. 1 | ... | MST000(BASIC/LEADER) |
| — | — | — | — | — | EXCEPT NO. 1 | ... | MST001(BASIC/FRIEND) |
| EQUAL TO OR LARGER THAN DANGER REFERENCE VALUE | — | 2 MIN OR LESS | — | — | — | ... | MST002(MISSION 1/ IMMEDIATELY AFTER START) |
| LESS THAN DANGER REFERENCE VALUE | — | — | — | — | — | ... | MST003(RESCUE REQUEST A) |
| — | — | — | — | — | — | ... | MST004(RESCUE REQUEST B) |
| — | DISADVAN-TAGEOUS | 1 MIN LEFT | — | — | — | ... | MST005(MISSION 2/ IMMEDIATELY BEFORE END) |
| — | — | — | ENEMY TANK | — | — | ... | MST006(FAR CONTACT) |
| — | — | — | — | ENEMY TANK | — | ... | MST007(CLOSE CONTACT) |
| ... | ... | ... | ... | ... | ... | ... | ... |

FIG. 16

STATEMENT SET

| STATEMENT SET ID | MST001(BASIC: FRIEND) | | | | | |
|---|---|---|---|---|---|---|
| STATEMENT IDENTIFICATION KEYWORD (527b) | DETAILED SELECTION CONDITION (527c) | STATEMENT ID (527d) | STATEMENT VOICE DATA (READ BY VOICE ACTOR) (527e) | CANDIDATE DISPLAY TEXT (527f) | LOG DISPLAY TEXT (527g) |
| OK ROGER YES | NONE | MSG001 | SUND-01001 | "YES" | "ROGER" |
| | MINIMUM CUMULATIVE PLAY COUNT IS 5 OR MORE | MSG002 | SUND-01002 | | "OK. LEAVE IT TO ME" |
| | ~ | ~ | ~ | | ~ |
| NO IMPOSSIBLE | NONE | MSG011 | SUND-01010 | "NO" | "CANNOT DO IT" |
| | HP OF CHARACTER IS LESS THAN DANGER REFERENCE VALUE | MSG012 | SUND-01011 | | "I CAN'T HOLD OUT. SORRY" |
| | ~ | ~ | ~ | | ~ |
| ..... | ..... | ..... | ..... | ..... | ..... |

FIG. 17

STATEMENT SET

| STATEMENT SET ID 527a | STATEMENT IDENTIFICATION KEYWORD 527b | DETAILED SELECTION CONDITION 527c | STATEMENT ID 527d | STATEMENT VOICE DATA 527e | CANDIDATE DISPLAY TEXT 527f | LOG DISPLAY TEXT 527g |
|---|---|---|---|---|---|---|
| MST002(MISSION 1/ IMMEDIATELY AFTER START) | HALLO | NONE | MSG041 | SUND-02001 | "HALLO" | "HALLO!" |
| | DO OUR BEST | MINIMUM CUMULATIVE PLAY COUNT IS 5 OR MORE | MSG042 | SUND-02002 | | "DO OUR BEST!" |
| | | ~ | ~ | ~ | | ~ |
| | WEST ∩ ATTACK WEST ∩ CAPTURE WEST ∩ INVASION | NONE | MSG053 | SUND-02031 | CAPTURE FROM WEST | "I THINK CAPTURE FROM WEST IS APPROPRIATE" |
| | | MINIMUM CUMULATIVE PLAY COUNT IS 5 OR MORE | MSG054 | SUND-02032 | | "LET'S TAKE WEST COURSE" |
| | .... | ~ | ~ | ~ | .... | ~ |

STATEMENT SET

| STATEMENT SET ID | MST006 (FAR CONTACT) | | | | | | |
|---|---|---|---|---|---|---|---|
| STATEMENT IDENTIFICATION KEYWORD | DETAILED SELECTION CONDITION | STATEMENT ID | STATEMENT VOICE DATA | CANDIDATE DISPLAY TEXT | LOG DISPLAY TEXT | ADDITIONAL INFORMATION ID |
| ENEMY ∩ TANK ∩ FOUND | NONE | MSG061 | SUND-06001 | "ENEMY TANK FOUND" | "ENEMY TANK FOUND" | IF01 |
| | NONE | MSG062 | SUND-06002 | | "I'VE FOUND, ENEMY TANK" | IF01(POSITION OF PLAYER'S CHARACTER) |
| ~ | ~ | ~ | ~ | ~ | ~ | ~ |
| ENEMY ∩ WEST ∩ MOVE | NONE | MSG072 | SUND-06010 | "ENEMY TANK IS MOVING WEST" | "ENEMY TANK IS MOVING WEST" | IF01(POSITION OF PLAYER'S CHARACTER) |
| | NONE | MSG073 | SUND-06011 | | "ENEMY TANK IS GOING WEST" | IF01(POSITION OF PLAYER'S CHARACTER) |
| .... | .... | .... | .... | .... | .... | .... |

FIG. 19

| MATCHING DATA 530 | | | | | | | |
|---|---|---|---|---|---|---|---|
| PLAYER'S CHARACTER ID | CHARACTER IDENTIFICATION KEYWORD | IP ADDRESS | FRIEND/ENEMY IDENTIFICATION | PLAYER ID | CHARACTER TYPE | CUMULATIVE PLAY COUNT | CUMULATIVE MATCH COUNT | ... |
| PC1 | NO. 1 | IP001 | FRIEND | PY1103 | CHARACTER 03 | 5 | 0 | ... |
| PC2 | NO. 2 | 0(PLAYER'S DEVICE) | FRIEND | PY0034 | CHARACTER 12 | 6 | 0 | ... |
| PC3 | NO. 3 | IP003 | FRIEND | PY0264 | CHARACTER 01 | 5 | 0 | ... |
| PC4 | NO. 4 | IP004 | FRIEND | PY0305 | CHARACTER 24 | 7 | 0 | ... |
| PC5 | NO. 5 | IP005 | ENEMY | PY1322 | CHARACTER 30 | 0 | 3 | ... |
| PC6 | NO. 6 | IP006 | ENEMY | PY0887 | CHARACTER 33 | 0 | 3 | ... |
| ... | | | | ... | | | | ... |

FIG. 25

554 DESTINATION IDENTIFICATION TBL

554a
| PLAYER'S CHARACTER ID | NO. 1, NO. 2, NO. 3, NO. 4 |
|---|---|

554b

| DESTINATION IDEN-TIFICATION KEYWORD | PLAYER'S CHARACTER ID | 554c |
|---|---|---|
| NO. 1 | PC1 | |
| NO. 2 | PC2 | |
| NO. 3 | PC3 | |
| NO. 4 | PC4 | |
| ⋮ | ⋮ | |
| NO. 8 | PC8 | |
| ALL MEMBERS OR EACH MEMBER | PC1~PC4 | |
| ENEMY | PCE | |

FIG. 26

556 SITUATION WORD LIBRARY  557

SITUATION WORD TBL

557a
| CHARACTER TYPE | CHARACTER 01 |
|---|---|

| TARGET STATEMENT ID | SELECTION CONDITION | SITUATION VOICE DATA | LOG DISPLAY TEXT |
|---|---|---|---|
| MSG101 | NUMBER OF FRIENDS 4 | SUND-0023 | "STAY AT IT" |
| MSG101 | NUMBER OF FRIENDS 3 | SUND-0024 | "DAMN IT!" |
| MSG101 | NUMBER OF FRIENDS 2 | SUND-0024 | "HURRY UP!" |
| ⋮ | ⋮ | ⋮ | ⋮ |

FIG. 32

| STATEMENT SET | | | | | | | | | | |
|---|---|---|---|---|---|---|---|---|---|---|
| STATEMENT SET ID | MST1001 | | | | | | | | | |
| SECOND HIERARCHICAL CLASSIFICATION SELECTION KEYWORD | THIRD HIERARCHICAL CLASSIFICATION SELECTION KEYWORD | ～ | nTH HIERARCHICAL CLASSIFICATION SELECTION KEYWORD | STATEMENT ID | STATEMENT VOICE DATA | LOG DISPLAY TEXT | ～ |
| 2, RESCUE REQUEST | 21, RESCUE OF PLAYER | ～ | 211, CLOSE ∩ RESCUE | MSG0211 | SOUND0211 | TEXT0211 | ～ |
| | | ～ | 212, SHOT ∩ RESCUE | MSG0212 | SOUND0212 | TEXT0212 | ～ |
| | | ～ | 213, FIRE ∩ RESCUE | MSG0213 | SOUND0213 | TEXT0213 | ～ |
| | 22, RESCUE OF FRIEND | ～ | 221, NO. 2 ∩ SURROUNDED | MSG0221 | SOUND0221 | TEXT0221 | ～ |
| ..... | ..... | ..... | ..... | ..... | ..... | ..... | ..... |

| STATEMENT SET | | | | | | | | |
|---|---|---|---|---|---|---|---|---|
| STATEMENT SET ID | MST006 (FAR CONTACT) | | | | | | | |
| | 527b | 527c | 527d | 527e | 527f | 527g | 527h | |
| | STATEMENT IDENTIFICATION KEYWORD | DETAILED SELECTION CONDITION | STATEMENT ID | STATEMENT VOICE DATA | CANDIDATE DISPLAY TEXT | LOG DISPLAY TEXT | ADDITIONAL INFORMATION ID | |
| | ENEMY ∩ TANK ∩ FOUND | NONE | MSG061 | SUND-06001 | "ENEMY TANK FOUND" | "ENEMY TANK FOUND" | IF11 | |
| | | NONE | MSG062 | SUND-06002 | | "I'VE FOUND ENEMY TANK" | IF11 (POSITION OF SENDER PLAYER'S CHARACTER) | |
| | | ∫ | ∫ | ∫ | | ∫ | ∫ | |
| | ENEMY ∩ TANK ∩ WEST ∩ MOVE | NONE | MSG072 | SUND-06010 | "ENEMY TANK IS MOVING WEST" | "ENEMY TANK IS MOVING WEST" | IF11 | |
| | | NONE | MSG073 | SUND-06011 | | "ENEMY TANK IS GOING WEST" | IF11 | |
| | | ∫ | ∫ | ∫ | | ∫ | ∫ | |
| | .... | .... | .... | .... | .... | .... | .... | |

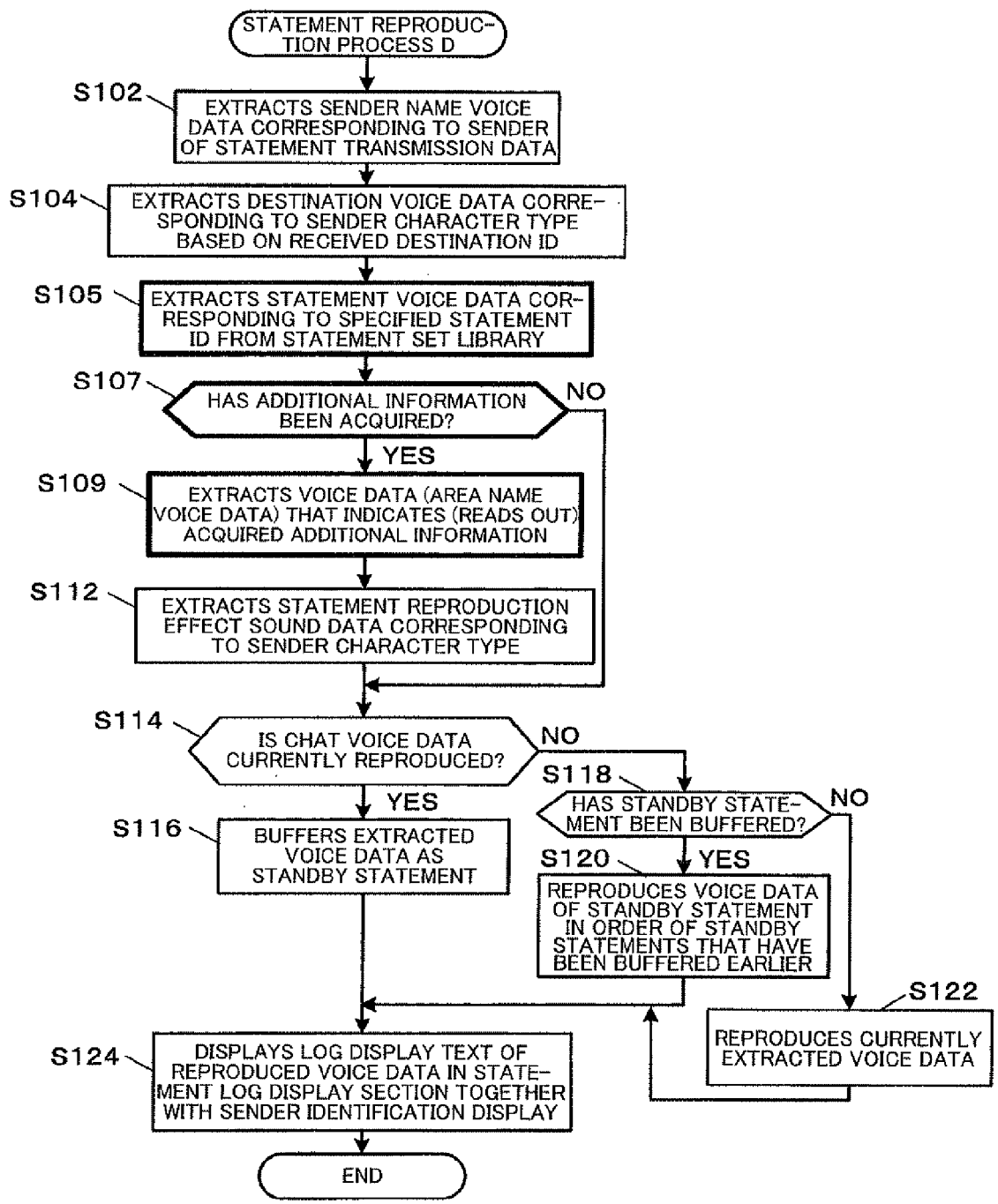

METHOD OF CONTROLLING COMPUTER DEVICE, STORAGE MEDIUM, AND COMPUTER DEVICE

Japanese Patent Application No. 2008-204046 filed on Aug. 7, 2008, is hereby incorporated by reference in its entirety.

BACKGROUND

A multi-player online game or a multi-player online match game that implements data communication among a plurality of game devices (i.e., computer devices) and allows a plurality of players to simultaneously enjoy a game in a single game space has been known.

A multi-player online game generally employs text chat technology (i.e., game devices exchange text information and display a text in a game screen) (see JP-A-2007-183811, for example) or voice chat technology (i.e., a game device transmits voice information about a voice input by the player into a microphone and a game device that has received the voice information reproduces the voice information from a speaker) (see JP-A-2004-336292, for example) in order to implement communication between the players.

A text chat has a disadvantage in that the player cannot perform a game operation when the player inputs a text using a keyboard during a chat. A text chat that implements a simple operation by allowing the player to select a text from fixed phrases provided in advance has been known. However, since the display ares of the game screen used for fixed phrases is limited, the number of phrases displayed (i.e., statements that can be used) is limited. Therefore, the amount of information used for communication is insufficient.

A voice chat has an advantage in that the player can chat with another player while performing a game operation by utilizing a headset that includes a microphone and a headphone or the like, and the amount of information that can be exchanged is significantly larger than that of a text chat. Therefore, a voice chat is suitable for a real-time simulation network game. However, a voice chat has a problem in that the number of players who can participate in the game may be limited due to an increase in the amount of data communication, or a delay may occur or an image may not be smoothly generated and reproduced due to heavy traffic on a communication channel. Moreover, since a beginner player may hesitate to speak like a game character or may not be able to speak as a game character, a beginner player may not be able to effectively utilize a voice chat. Furthermore, since a voice is directly transmitted, it is difficult to restrict an ill-mannered statement (e.g., swearing).

SUMMARY

According to one aspect of the invention, there is provided a method of controlling a computer device during an online game to implement communication between a player who operates the computer device and another player who operates another computer device, the method comprising:

recognizing a voice of the player;

specifying a statement type that corresponds to the recognized voice of the player;

transmitting information about the specified statement type to the other computer device;

receiving information about the statement type of the other player from the other computer device;

extracting voice data of a statement that corresponds to the received information from predetermined voice data; and outputting a sound based on the extracted voice data.

According to another aspect of the invention, there is provided a method of controlling a computer device during an online game to implement communication between a player who operates the computer device and another player who operates another computer device, the method comprising:

transmitting voice data to the other computer device, the voice data being data that indicates a voice produced by the player;

receiving voice data of the other player from the other computer device;

recognizing a voice included in the voice data of the other player;

specifying a statement type that corresponds to the recognized voice of the other player;

extracting voice data of a statement that corresponds to the specified statement type from predetermined voice data; and outputting a sound based on the extracted voice data.

BRIEF DESCRIPTION OF THE DRAWINGS

FIG. 6 is a view illustrative of the chat transmission/reception concept according to a first embodiment.

FIG. 8 is a view showing a data configuration example of player information.

FIG. 15 is a view showing a data configuration example of a statement set selection condition TBL.

FIG. 16 is a view showing a data configuration example of a statement set.

FIG. 17 is a view showing a data configuration example of a statement set.

FIG. 18 is a view showing a data configuration example of a statement set.

FIG. 19 is a view showing a data configuration example of matching data.

FIG. 25 is a view showing a data configuration example of a destination identification TBL according to a second embodiment.

FIG. 26 is a view showing a data configuration example of a situation word library.

FIG. 32 is a view showing a data configuration example of a statement set according to a third embodiment.

FIG. 36 is a view showing a data configuration example of a statement set according to a fourth embodiment.

FIG. 41 is a flowchart illustrative of the flow of a statement reproduction process (statement reproduction process D) according to a fourth embodiment.

DESCRIPTION OF EXEMPLARY EMBODIMENTS

Figure 1:
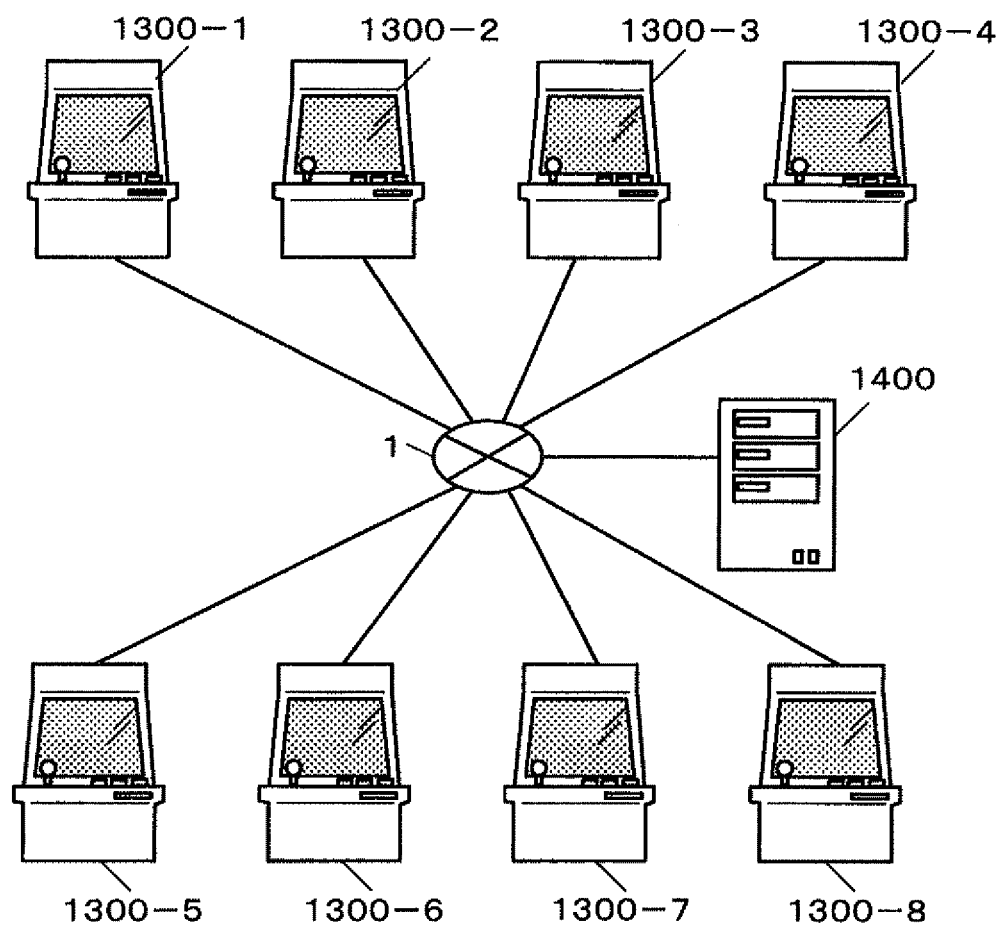
FIG. 1 is a view showing a system configuration example.

According to one embodiment of the invention, there is provided a method of controlling a computer device during an online game to implement communication between a player who operates the computer device and another player who operates another computer device, the method comprising:
  recognizing a voice of the player;
  specifying a statement type that corresponds to the recognized voice of the player;
  transmitting information about the specified statement type to the other computer device;
  receiving information about the statement type of the other player from the other computer device;
  extracting voice data of a statement that corresponds to the received information from predetermined voice data; and
  outputting a sound based on the extracted voice data.

According to another embodiment of the invention, there is provided a computer device that executes an online game while implementing data communication with another computer device, the computer device comprising:
  a voice recognition section that recognizes a voice of the player;
  a statement type determination section that specifies a statement type that corresponds to the voice of the player that has been recognized by the voice recognition section;
  a transmission section that transmits information about the statement type specified by the statement type determination section to the other computer device;
  a reception section that receives information about the statement type of the other player from the other computer device;
  a voice data extraction section that extracts voice data of a statement that corresponds to the received information from predetermined voice data; and
  a sound output control section that outputs a sound based on the voice data extracted by the voice data extraction section.

According to the above configuration, the statement type can be specified by recognizing the voice of the player, and the information about the specified statement type can be transmitted to another computer device. On the other hand, when the computer device has received the information about the statement type from another computer device, the voice data of the statement corresponding to the received information can be extracted and reproduced.

Therefore, since the player can participate in a chat by merely making a statement, the player need not stop operating the player's character when making a statement in the same manner as a voice chat.

Since data communication is performed by utilizing the information about the statement type, the amount of data communication can be reduced in the same manner as a text chat.

The game device that has received the information about the statement type extracts and reproduces the voice data provided in advance corresponding to each statement type although a statement is utilized in the same manner as a voice chat. Therefore, even if another player has made an ill-mannered statement (e.g., swearing), the ill-mannered statement is not reproduced by the game device while the player is notified of only the effect of the statement. Therefore, the player can pleasantly enjoy the game.

The method may further comprise:
  transmitting information about a position of a player's character of the player in a game space to the other computer device when the specified statement type is a statement type that includes the position of the player's character of the player in the game space as notification information; and
  receiving information about a position of a player's character of the other player that has been transmitted from the other computer device, and
  the outputting of a sound may include outputting the voice data using the received information about the position of the player's character of the other player.

According to the above configuration, the position information of the player's character in the game space can be transmitted to another computer device, and the computer device that has received the position information can output the position information as a sound. Therefore, when the position information is included in the statement (e.g., the player necessarily incorporates the position information in the statement when making a rescue statement), the position information included in the statement can be automatically transmitted to another computer device and output as a sound.

The method may further comprise:

identifying keywords produced by the player and an order of the keywords; and determining a destination computer device based on a given-numbered keyword among the identified keywords, the transmitting of information may include transmitting the information about the specified statement type to the destination computer device.

The term "order" used herein is not limited to an order indicated by a natural number (first, second, . . . ), but may be an order indicated by second and subsequent keywords, for example.

According to the above configuration, the player can inform a specific player of the statement by incorporating the destination in the statement according to a predetermined order.

According to another embodiment of the invention, there is provided a method of controlling a computer device during an online game to implement communication between a player who operates the computer device and another player who operates another computer device, the method comprising:

transmitting voice data to the other computer device, the voice data being data that indicates a voice produced by the player;

receiving voice data of the other player from the other computer device;

recognizing a voice included in the voice data of the other player;

specifying a statement type that corresponds to the recognized voice of the other player;

extracting voice data of a statement that corresponds to the specified statement type from predetermined voice data; and outputting a sound based on the extracted voice data.

According to another embodiment of the invention, there is provided a computer device that executes an online game while implementing data communication with another computer device, the computer device comprising:

a transmission section that transmits voice data to the other computer device, the voice data being data that indicates a voice produced by the player;

a reception section that receives voice data of the other player from the other computer device;

a voice recognition section that recognizes a voice included in the voice data of the other player;

a statement type determination section that specifies a statement type that corresponds to the recognized voice of the other player;

a voice data extraction section that extracts voice data of a statement that corresponds to the specified statement type from predetermined voice data; and a sound output control section that outputs a sound based on the extracted voice data.

According to the above configuration, the voice data that indicates the voice of the player can be transmitted to another computer device. On the other hand, when the computer device has received the voice data from another computer device, the received data is analyzed by voice recognition, and the voice data that reads out the corresponding statement is extracted and reproduced.

Therefore, since the player can participate in a chat by merely making a statement, the player need not stop operating the player's character when making a statement in the same manner as a voice chat.

The game device that has received the information about the statement type extracts and reproduces the voice data provided in advance corresponding to each statement type although a statement is utilized in the same manner as a voice chat. Therefore, even if another player has made an ill-mannered statement (e.g., swearing), the ill-mannered statement is not reproduced by the game device while the player is notified of only the effect of the statement. Therefore, the player can pleasantly enjoy the game.

In the method, the game may be a game in which a plurality of players play a match via a communication channel;

a plurality of pieces of voice data may be provided as the voice data, the plurality of pieces of voice data containing a similar statement, but being read out with a different degree of closeness; and the extracting of the voice data may include extracting voice data that is read out with a degree of closeness corresponding to a play record of the player and the other player.

According to the above configuration, the degree of closeness between the players can be determined based on the play record. The play record may be the play count, or the degree of closeness may be determined based the victory/defeat ratio (e.g., the degree of closeness may be determined to be low when the play record is one-sided).

The method may further comprise:

identifying keywords produced by the player and an order of the keywords, and the specifying of the statement type may include specifying the statement type using the identified keywords and the order of the keywords.

According to the above configuration, the statement type can be specified using the order of the identified keywords. Therefore, the variety of the statement type can be increased.

The method may further comprise:

extracting effect sound data that corresponds to the other player from effect sound data that has been defined in advance corresponding to each player, and the outputting of a sound may include controlling an order of reproduction and synthetic reproduction of a sound based on the effect sound data and a sound based on the voice data.

According to the above configuration, the effect sound that corresponds to another player is selected, and synthesized when reproducing the voice data of the statement. For example, a plurality of pieces of reproduction target sound data may be synthesized to overlap. In this case, a silent state due to a time lag that occurs when sequentially reproducing the voice data can be canceled so that the player does not become aware of an interval between the statement voices.

In the method, the game may be a game in which a plurality of groups to play a match, each of the plurality of groups being formed by a plurality of players; and the outputting of a sound may include processing and outputting a sound based on whether or not the player and the other player differ in group.

For example, noise that is mixed into radio communication, modulation of sound, noise, echo, break or the like due to compression and extraction may be appropriately used for sound processing.

According to the above configuration, since the processed sound can be changed based on whether the players of the same group have a chat or the players of different groups have a chat, the player can be notified of such a situation.

The difference between communication between the players of the same group in a battlefield and radio interception can be realistically reproduced by changing the type of noise or break during radio communication when processing a sound. This is suitable for a match game between groups.

In the method, the outputting of a sound may include outputting situation voice data, the situation voice data being determined in advance corresponding to a game state.

The situation voice data indicates words added to the statement depending on the game result, a situation of a match game between groups, the strength value of the player's character operated by the speaker, the number of enemy characters that surround the player's character, or the like. In a situation in which a higher officer issues an order to a soldier, for example, the officer would add a word "Good" to an order (statement) "Go to the right building" (i.e., "Good. Go to the right building") when the situation is advantageous. When the situation is disadvantageous, the officer would add words "Hurry up!" to an order (statement) "Go to the right building" (i.e., "Hurry up! Go to the right building"). In such a situation, the word "Good" or the words "Hurry up!" correspond to the situation words. The voice data of the situation words is the situation voice data.

Since words that indicate the mental state or emotions of the speaker can be automatically added to the statement and reproduced even if the player does not actually speak the words, a more realistic chat can be implemented by merely reproducing a voice provided in advance.

The method may further comprise:

selecting statement type candidates from a plurality of statement types based on a game state; and displaying the selected statement type candidates, and the specifying of the statement type may include specifying the statement type from the selected statement type candidates.

According to the above configuration, the statement type candidates are selected from a number of statement types and displayed in the game screen. Therefore, the player can determine a suitable statement and expression while playing the game.

Therefore, the player can advantageously experience the game world by gradually becoming used to a statement and expression suitable for the game. In particular, when two or more players play the game in cooperation, the quality of the team play is improved. Therefore, the players can further enjoy the game.

The method may further comprise:

calculating a play time that has elapsed after the game has started or a remaining time that remains until a given time limit is reached, and the selecting of the statement type candidates may include selecting the statement type candidates using the play time or the remaining time as a parameter of the game state.

According to the above configuration, the statement type candidates can be selected based on the play time or the remaining time. For example, a statement for which the usage frequency changes according to the elapsed time (e.g., a statement during arrangements immediately after the game has started or a statement for strategy confirmation immediately before the game ends) can be utilized at an appropriate timing. In particular, the above configuration is effective in a team-match multi-player game with a time limit in order to make the game (game play) more interesting.

In the method, the game may be a match game;

the method may further comprise calculating a situation index during the game, the situation index indicating a situation of the player and/or a situation of an opposing player; and the selecting of the statement type candidates may include selecting the statement type candidates using the situation index as a parameter of the game state.

According to the above configuration, the statement type candidates can be selected based on the situation of each team. For example, a strategy change statement corresponding to the situation can be utilized at an appropriate timing. Moreover, since the variety of the statement can be increased by selecting a different statement corresponding to the situation, high flexibility and reality can be implemented without using a direct voice chat.

In the method, the game may be a game in which a plurality of characters take part in a battle and a player's character that has been damaged during the battle may not take part in the battle;

the method may further comprise calculating damage to each of the plurality of characters during the game; and the selecting of the statement type candidates may include selecting the statement type candidates using the damage applied to the player's character of the player as a parameter of the game state.

According to the above configuration, the statement type candidates can be selected based on the damage applied to the player's character of the player. Therefore, when the player makes a rescue statement, a different statement can be set and selectively used depending on the situation (e.g., when the damage applied to the player's character is small or when the player's character is severely damaged and needs urgent help). Therefore, the variety of the statement can be further increased so that high flexibility and reality can be implemented.

In the method, the extracting of the voice data may include extracting voice data of an actor corresponding to the player from actor voice data, the actor voice data being provided in advance corresponding to each player.

According to the above configuration, the voice data indicates the voice of the actor determined in advance corresponding to each player. For example, an actor who performs each player's character is determined in advance, and the voice data when the actor reads out the statement is used. Therefore, the player can easily listen to the reproduced statement voice as compared with a normal chat. Moreover, the atmosphere of the game is improved.

In the method, the computer device may include a reading section that reads specific information about a player that can specify an actor from an external recording medium, the external recording medium storing stores the specific information and being possessed by the player;

the method may further comprise:

transmitting the specific information to the other computer device; and receiving the specific information about the other player from the other computer device; and the extracting of the voice data may include specifying an actor based on the received specific information about the other player, and extracting voice data of a corresponding statement from the voice data of the specified actor.

According to the above configuration, the voice data of the statement read out by the actor for the player's character is selected and reproduced.

In the method, the game may be a game that follows a world of a given image work;

the method may further comprise:

allowing the player to select a character that appears in the image work;

notifying the other computer device of the selected character; and receiving information about a character selected by the other player from the other computer device; and the extracting of the voice data may include extracting voice data corresponding to the character selected by the other player from voice data recorded by an actor corresponding to each character that appears in the image work.

The term "image work" refers to a product that contains an image and a voice (e.g., a movie, a videogram, or a movie file based on script image control), for example.

According to the above configuration, the statement can be reproduced using a voice that differs corresponding to each character of the image work. An online multi-player game that follows the world of an existing image work is known. However, when the player participates in a voice chat during the game, since the real voice of the player that completely differs from the voice of the character is used, the player cannot be fully involved in the game due to the voice chat. According to this embodiment, the player can be further involved in the game world by preventing such a situation.

According to another embodiment of the invention, there is provided a computer-readable storage medium storing a program that causes a computer to execute one of the above methods.

The term "information storage medium" used herein includes a magnetic disk, an optical disk, an IC memory, and the like.

Exemplary embodiments to which the invention is applied are described below. An example in which an arcade game device is used as a computer device is described below. Note that the computer device may be a consumer game device, a personal computer, or the like.

First Embodiment

A first embodiment to which the invention is applied is described below taking an example of executing an online multi-player game in which a plurality of players divided into two teams (two groups) play a match.

System Configuration

FIG. 1 is a view showing a system configuration example according to this embodiment. As shown in FIG. 1, a plurality of arcade game devices 1300 (1300-1 to 1300-8) are connected through a communication channel 1 (e.g., Internet, local network, private network, or another network, router, and the like) so that the arcade game devices 1300 can exchange data. One arcade game device 1300 is operated by one player. In FIG. 1, eight arcade game devices 1300 are provided so that eight players (i.e., four players belong to one team) can play the game. Note that the number of arcade game devices 1300 per team may be appropriately set.

The data communication may be implemented by a peer-to-peer system after each arcade game device 1300 accesses a matching server 1400 when the game starts and acquires information (e.g., IP address) about other arcade game devices 1300, or may be implemented by a client/server system using the matching server 1400. A known system configuration that deals with an online multi-player game may be appropriately applied.

Configuration of Arcade Game Device

Figure 2:
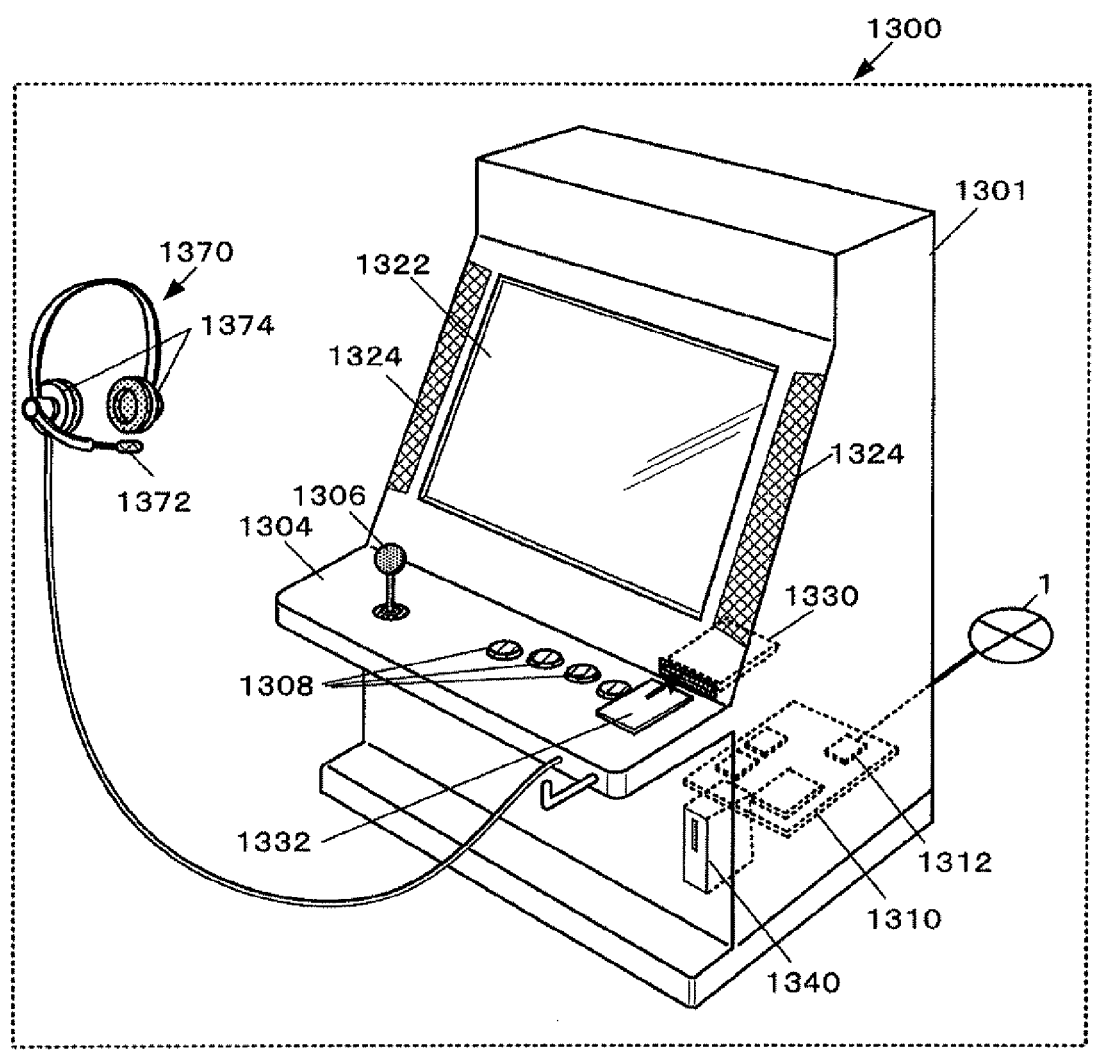
FIG. 2 is a perspective external view showing a configuration example of an arcade game device.

FIG. 2 is a perspective external view showing a configuration example of the arcade game device 1300. The arcade game device 1300 (i.e., computer device) includes a console 1304 that protrudes forward from a game device main body 1301, and input devices (e.g., a joystick 1306 and a plurality of push switches 1308) that are provided on the console 1304 and allow the player to perform an operation input. A video monitor 1322 (e.g., liquid crystal panel display or CRT) that displays a game image, a speaker 1324 that outputs a game sound and an effect sound, and a game card reader/writer 1330 that reads and writes data from and into a game card 1332 (i.e., portable information storage medium) are provided in the upper area of the game device main body 1301. A coin counter 1340, a control unit 1310, and a power supply device (not shown) are provided in the lower area or inside of the game device main body 1301. The arcade game device 1300 also includes a chat headset 1370 that includes a microphone 1372 and a headphone 1374.

The control unit 1310 (computer board) includes electric/electronic instruments such as a processor (e.g., central processing unit (CPU), graphics processing unit (GPU), and digital signal processor (DSP)), an application-specific integrated circuit (ASIC), and an IC memory. The control unit 1310 includes a communication device 1312 that connects to the communication channel 1 (e.g., Internet, local area network (LAN), or wide area network (WAN)), and implements data communication with an external device (particularly another arcade game device 1300 and the matching server 1400). The control unit 1310 reads a system program and a game program stored in an information storage medium (e.g., IC memory or hard disk), and performs calculations to control each section of the arcade game device 1300.

When the player desires to play the online multi-player game using the arcade game device 1300, the player must register himself and obtain the game card 1332 that stores player information (e.g., handle name and the type of character used) in the same manner as a known online multi-player game. When the player plays the online multi-player game, the player inserts the game card 1332 into the game card reader/writer 1330 of the arcade game device 1300 so that the game card reader/writer 1330 reads the player information stored in the game card 1332. A dedicated registration device that is provided separately from the arcade game device 1300 or the arcade game device 1300 may receive player registration and issue the game card 1332. Note that the matching server 1400 stores and manages the player registration information.

When the coin counter 1340 has detected that a coin corresponding to a predetermined amount has been inserted, the control unit 1320 reads and executes the game program and a voice recognition program for recognizing the player's voice collected by the headset 1370 so that the arcade game device 1300 functions as a game device that implements the invention.

When the arcade game device 1300 starts the game, the arcade game device 1300 reads the player information from the player's game card 1332 through the game card reader/writer 1330. The arcade game device 1300 then accesses the matching server 1400 and performs a matching process in the same manner as a known online multi-player game to acquire data transmission destination information (e.g., IP address) and player information about another arcade game device 1300 that participates in the online multi-player game (hereinafter may be simply referred to as "another game device"). The arcade game device 1300 transmits an operation code based on an operation input performed using the joystick 1306 or the push switch 1308 and a statement ID (i.e., information that indicates a statement type that corresponds to one statement during a chat) selected based on the recognition result for the player's voice collected by the microphone 1372 of the headset 1370 to another game device in a given cycle, and receives an operation code and a statement ID transmitted from another game device.

The arcade game device 1300 controls the movement of a player's character that is disposed in a game space formed in a virtual three-dimensional space based on an operation code received from another game device and an operation code based on an operation input performed using the arcade game device 1300, for example. The arcade game device 1300 photographs the state in the game space using a virtual camera to generate a game screen (image), and generates a game sound (e.g., background music (BGM) or effect sound) at an appropriate timing. The generated game screen is displayed on the video monitor 1322, and the generated game sound is output from the speaker 1324. The player plays the game while watching the game screen displayed on the video monitor 1322 and listening to the game sound output from the speaker 1324. When the arcade game device 1300 has received the statement ID, the arcade game device 1300 extracts sound data corresponding to the received statement ID from sound data provided in advance, and reproduces the extracted sound data. The reproduced sound data is output from the headphone 1374.

Outline of Game

Figure 3:
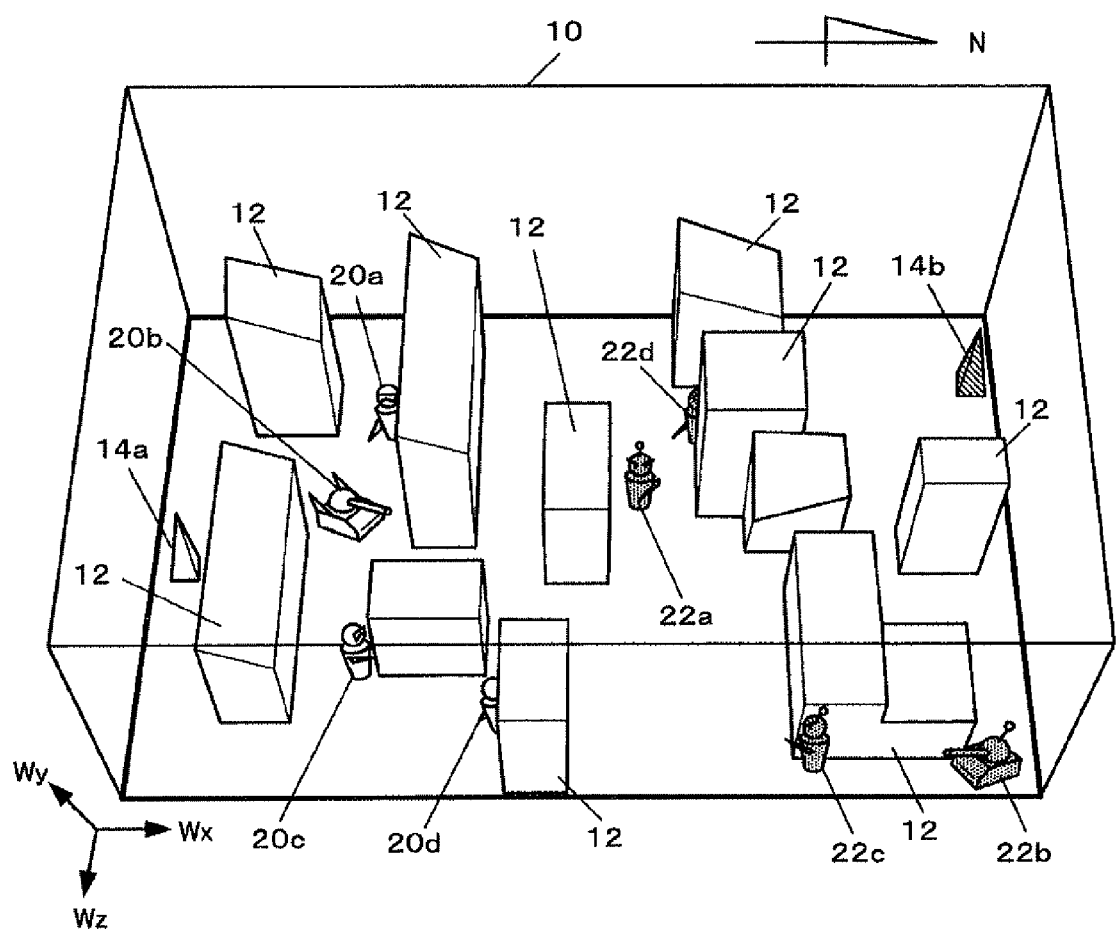
FIG. 3 is a view illustrative of an outline of an online multi-player game according to a first embodiment.

FIG. 3 is a view illustrative of an outline of the online multi-player game according to this embodiment. In this embodiment, a match game in which four players form one team (group) and two teams fight against each other in a game space 10 using a weapon (e.g., firearm) is executed.

As shown in FIG. 3, the game space 10 is a rectangular parallelepiped area that virtually extends from north to south. Obstacles 12 are disposed in various places, and team bases 14a and 14b are respectively disposed on the south end and the north end, for example. Four player's characters 20a, 20b, 20c, and 20d including a tank form one of the teams, and four player's characters 22a, 22b, 22c, and 22d including a tank form the other team. Each player's character corresponds to one of the arcade game devices 1300, and is controlled based on an operation input performed by the player who operates the corresponding arcade game device 1300.

Figures 4, 5:
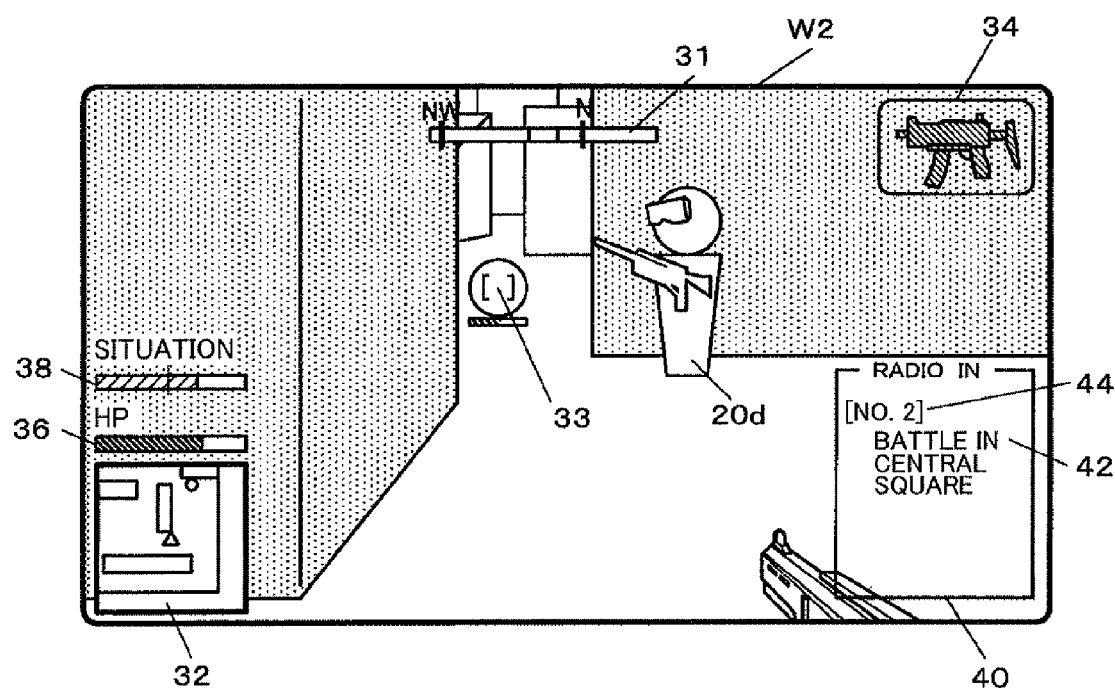
FIG. 4 is a view showing an example of a game screen of an online multi-player game according to a first embodiment.
FIG. 5 is a view showing a chat statement rule according to a first embodiment.

FIG. 4 is a view showing an example of a game screen of the online multi-player game according to this embodiment. A game screen W2 displayed on each arcade game device 1300 is drawn from the first person point of view of the player's character that corresponds to each game device.

A direction indicator 31, a map display section 32, a sight mark 33, a selected weapon display section 34, a hit point gauge 36, a situation index display section 38, and a statement log display section 40 are displayed in the game screen.

The hit point gauge 36 indicates the current hit point of the player's character. The player's character cannot take part in a battle when the hit point has reached "0".

The situation index display section 38 indicates the situation of the player's team and the opposing team by means of a bar. The player's team is superior to the opposing team when the end of the bar is positioned on the right side with respect to the center, and is inferior to the opposing team when the end of the bar is positioned on the left side with respect to the center. Technology of a known team match game may be appropriately applied to the situation index. For example, the index of each team is calculated according to a given rule (e.g., the index increases as the total hit point of all of the player's characters increases, and decreases as the number of player's characters that cannot take part in a battle increases), and the situation index is calculated based on the ratio of the index of each team thus calculated.

A statement text 42 corresponding to the statement ID received from another game device is sequentially scrolled in the statement log display section 40 together with a sender identification display 44 that indicates the sender of the statement.

The player moves the player's character while chatting with another player of the player's team, and shoots the player's character or the base of the opposing team while setting the sight mark 33 displayed in the screen on the player's character or the base of the opposing team positioned within the field of view. A team for which all of the player's characters that form the team cannot take part in a battle or the base has been destroyed loses the game.

Chat

FIG. 5 is a view showing a chat rule according to this embodiment. FIG. 5 shows an example in which the player who operates the arcade game device 1300-3 (No. 3) has received a rescue request "This is No. 2. I'm surrounded by the enemy!" from the player who operates the arcade game device 1300-2 (No. 2) (player's team), and informed all of the remaining players of the player's team that the player will back up No. 2.

In this embodiment, a chat statement is basically transmitted to all of the players of the team. Note that raw sound data and text data input using a keyboard or the like are not transmitted to other game devices of the team. Specifically, a keyword text is created from the player's voice by a voice recognition process. The statement ID is determined based on the keyword registered in advance and transmitted to other game devices. The game device that has received the statement ID reproduces statement sound data provided in advance corresponding to the received statement ID to implement a pseudo voice communication chat.

Specifically, the player is instructed before the game starts so that the player states a statement start keyword/sender identification keyword 50, a destination identification keyword 52, a statement identification keyword 54, and a statement completion keyword/transmission permission keyword 56 in this order.

In this embodiment, since the player's character is a mobile weapon (e.g., robot or tank) operated by a pilot, the players chat with each other as if the players communicate over a police radio or a military radio. Therefore, names "No. 1" to "No. 4" (one team) and names "No. 5" to "No. 8" (the other team) are used as the statement start keyword/sender identification keyword 50 and the destination identification keyword 52. Note that the handle name of each player or the like may be appropriately used. When the player's character is not a weapon, but is a person, an animal, or the like, the name of the person, animal, or the like in the game may be used. Each name, "each member" or "all members", and combinations of the names (e.g., "No. 1 and No. 2" and "No. 1 and No. 3") are registered in advance as voice recognition dictionary data.

A keyword necessary for conversation in the game is appropriately set as the statement identification keyword 54. In this embodiment, terms "OK", "YES", "NO", "unclear", "back up", "pincers movement", "turn back", "hold up", "rescue", "move", and "precede" relating to the attack/defense strategy by team play are set as the statement identification keyword 54, for example. These terms are also registered in advance as the voice recognition dictionary data.

The statement completion keyword/transmission permission keyword 56 is a keyword that indicates the end of the statement and permits transmission of the statement in the currently selected state. The keyword used as the statement completion keyword/transmission permission keyword 56 is also registered in advance as the voice recognition dictionary data.

FIG. 6 is a view illustrative of the chat transmission/reception concept according to this embodiment. In FIG. 6, the process proceeds in the order from (1) to (3). The control unit 1310 recognizes the keyword registered in advance as the voice recognition dictionary data. The control unit 1310 determines the start of the statement, the destination of the statement, the details of the statement, and the finish/transmission permission of the statement based on the order of the keywords that have been recognized.

As indicated by (1) in FIG. 6, when a player P3 who operates the arcade game device 1300-3 has stated that "This is No. 3.", the control unit 1310 recognizes the keyword "No. 3" as the statement start keyword/sender identification keyword 50, and determines that the chat statement has started.

The control unit 1310 executes a statement set automatic selection process to select a statement set appropriate for the current game progress state from a plurality of statement sets that differ in category and are registered in advance, and displays a candidate display text 61 of the statement (message) included in the selected statement set in a statement candidate display section 60 in the game screen. The player is thus informed of a statement that is appropriate in the current situation in the game world.

As indicated by (2) in FIG. 6, when the player P3 who operates the arcade game device 1300-3 has stated that "To each member. I'll back up!", the control unit 1310 recognizes the second keyword "each member" as the destination identification keyword 52, and recognizes the third or subsequent keyword "back up" as the statement identification keyword 54. The control unit 1310 displays the candidate display text of the statement in the statement candidate display section 60 in a special display form (e.g., highlights the candidate display text) to indicate the currently selected statement type to the player.

As indicated by (3) in FIG. 6, the player P3 checks the candidate display text 61 of the statement displayed in a special display form, and states "over" that corresponds to the statement completion keyword/transmission permission keyword 56 when the candidate display text 61 is correct to finish the chat statement.

The control unit 1310 detects the statement completion keyword/transmission permission keyword 56 by a voice recognition process, and determines that the player P3 has completed the statement and permitted transmission. The control unit 1310 then transmits the destination ID corresponding to the destination identification keyword 52 and the statement ID corresponding to the statement identification keyword 54 to all of the remaining game devices of the player's team (i.e., the destination identification keyword 52 in this example is "each member").

The internal storage device of each arcade game device 1300 stores destination sound data that indicates a destination and statement sound data that indicates a statement in advance corresponding to each of a plurality of destination IDs and a plurality of statement IDs. Each arcade game device 1300 extracts and reproduces destination sound data 63 and statement sound data 64 corresponding to the destination ID and the statement ID received from the arcade game device 1300-3, and outputs the destination and the statement from the headphone 1374.

In this embodiment, the statement sound data 64 is recorded in advance corresponding to an actor for a pilot that controls each player's character in a movie that has a world that forms the game. When each arcade game device 1300 has received the statement ID from No. 3, each arcade game device 1300 reproduces the destination sound data 63 and the statement sound data 64 recorded in a voice of a pilot of the player's character of No. 3.

The actual words (statement) reproduced based on the statement sound data 64 may differ from the candidate display text 61 displayed in the statement candidate display section 60 or the statement of the player P3 insofar as the reproduced words have the same meaning as the candidate display text 61 or the statement of the player P3. In the example shown in FIG. 6, a sound "This is No. 3! Leave backing up to me!" reproduced by the arcade game device 1300-2 differs from the actual statement of the player P3, but has the same meaning as the statement of the player P3 and is reproduced in a voice of the pilot that operates No. 3 in the original movie. Specifically, a statement (message) may not be accurate during a chat. It suffices that a statement include a keyword that indicates the meaning of the statement. In the example shown in FIG. 6, the player P3 may state "I'll back up." or "Leave backing up to me." insofar as the keyword "back up" is included as the statement identification keyword 54.

According to this embodiment, the player can communicate with another player in real time while operating the joystick 1306 and the button switch 1308, and can enjoy the convenience of a known voice chat.

Since the statement set is automatically selected and displayed in the statement candidate display section 60, a situation in which a number of statement candidates are unnecessarily displayed on the game screen can be prevented so that visibility can be improved. The player P3 observes the statement set displayed in the statement candidate display section 60 to determine a statement appropriate for the game world (e.g., a pilot-like statement that refers to another plane by the number, or a police/military-like statement that uses a particular YES/NO expression) and an appropriate statement corresponding to the game state (e.g., a position that affects team fight or state report). Therefore, the player is more involved in the game by utilizing the statement set displayed in the statement candidate display section 60. Moreover, the player can more quickly understand the team strategy and efficiently utilize the team strategy.

Moreover, since the voice of the player is not directly transmitted to another player, differing from a known voice chat, the player can enjoy the game while making a desired chat statement without hesitation as if the player were a pilot in a movie. Specifically, high game operability and high game playability can be achieved.

On the other hand, since predetermined words are reproduced in the voice of an actor registered in advance, an ill-mannered statement (e.g., swearing) of the player is not reproduced. Therefore, the player can pleasantly listen to the statement. Moreover, since the voice of the actor for the movie is reproduced, the player is highly involved in the game.

Functional Blocks

A functional configuration that implements the above-described chat is described below.

Figure 7:
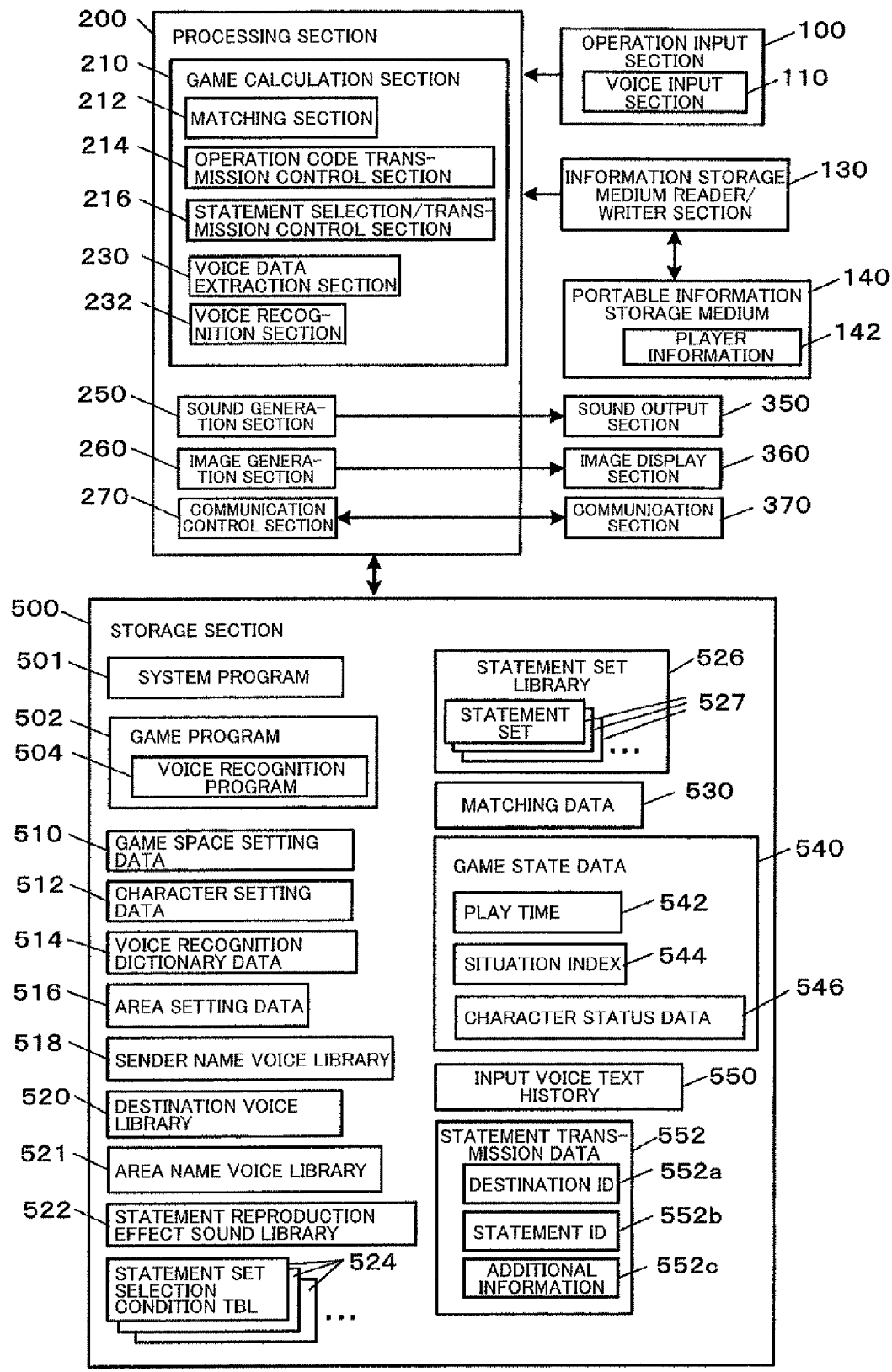
FIG. 7 is a functional block diagram showing an example of a functional configuration according to a first embodiment.

FIG. 7 is a block diagram showing an example of the functional configuration according to this embodiment. As shown in FIG. 7, the arcade game device 1300 according to this embodiment includes an operation input section 100, an information storage medium reader/writer section 130, a processing section 200, a sound output section 350, an image display section 360, a communication section 370, and a storage section 500.

The operation input section 100 outputs an operation input signal to the processing section 200 based on an operation input performed by the player. In this embodiment, the operation input section 100 includes a voice input section 110. In FIG. 2, the joystick 1306, the push switch 1308, and the microphone 1372 of the headset 1370 (corresponding to the voice input section 110) correspond to the operation input section 100.

The information storage medium reader/writer section 130 reads and writes data from and into a portable information storage medium 140 (external storage medium) that stores player information 142 and the like. For example, the information storage medium reader/writer section 130 is implemented by a magnetic card reader/writer when the game card 1332 (portable information storage medium 140) is a magnetic card, and is implemented by an IC card reader/writer when the game card 1332 is an IC card. The game card reader/writer 1330 shown in FIG. 2 corresponds to the information storage medium reader/writer section 130.

As shown in FIG. 8, the player information 142 includes a player ID 144, a handle name 146, a character type 148 that indicates the type of the player's character, a cumulative result 150 of the player's team, and a rank 152 in the game world, for example. The player information 142 also includes a friend player history 154 that stores an another player ID of another player who has played the game with the player as a friend, and a cumulative play count that indicates the number of times that the players have played the game together. The player information 142 also includes an opposing player history 156 that stores an another player ID of another player who has played the game with the player as an opposing player, and a cumulative play count that indicates the number of times that the players have played the game together. The player information is managed in the same manner as in a known online multi-player game. In this embodiment, the player ID 144 and the handle name 146 are determined when the player registers himself. The character type 148 is determined and updated when the player registers himself or the game starts. The character type 148 is appropriately updated when the game ends.

The processing section 200 is implemented by electronic parts such as a microprocessor, an application specific integrated circuit (ASIC), and an IC memory. The processing section 200 exchanges data with each functional section including the operation input section 100 and the storage section 500, and controls the operation of the arcade game device 1300 by performing calculations based on a given program, data, and the operation input signal from the operation input section 100. In FIG. 2, the control unit 1310 provided in the game device main body 1301 corresponds to the processing section 200.

The processing section 200 according to this embodiment includes a game calculation section 210, a sound generation section 250, an image generation section 260, and a communication control section 270.

The game calculation section 210 executes a game process. For example, the game calculation section 210 selects and sets the character type of the player's character before the game starts, forms a game space in a virtual three-dimensional space, controls the movement of the player's character disposed in the virtual three-dimensional space, performs a hit determination process and a physical calculation process, calculates the situation index that indicates the situation of each team, and generates each element (e.g., direction indicator 31, map display section 32, hit point gauge 36, and situation index display section 38 shown in FIG. 4) that forms the game screen (e.g., radar screen). The game calculation section 210 according to this embodiment includes a matching section 212, an operation code transmission control section 214, a statement selection/transmission control section 216, a voice data extraction section 230, and a voice recognition section 232.

The matching section 212 executes a matching process that accesses the matching server 1400 when the game starts, and exchanges and acquires information (e.g., IP address) about each arcade game device that participates in the game. In this embodiment, one team is formed by four player's characters. One of the teams is formed by the player's characters No. 1 to No. 4, and the other team is formed by the player's characters No. 5 to No. 8. Therefore, the matching section 212 acquires the IP addresses of the eight arcade game devices, the player information about each player, and the like. The matching section 212 stores the information acquired by the matching process in the storage section 500 as matching data 530.

The operation code transmission control section 214 automatically transmits a signal that relates to the movement of the player's character based on the operation input signal input from the operation input section 100 to the other game devices that participate in the game in a given cycle.

The statement selection/transmission control section 216 specifies the statement type from a plurality of statement types provided in advance based on the statement of the player input from the voice input section 110, and transmits the statement type to the other game devices. Specifically, the statement selection/transmission control section 216 compares the voice recognition result of the voice recognition section 232 with a given keyword to (1) determine the start of the statement and (2) specify the destination ID of the statement. The statement selection/transmission control section 216 (3) selects the statement set based on the game state and the player information, and (4) compares the voice recognition result of the voice recognition section 232 with a given keyword to specify one statement (message) from the candidates included in the selected statement set and select the statement ID. The statement selection/transmission control section 216 then (5) determines the end of the statement, and transmits the specified destination ID and statement ID to the other game devices of the player's team.

The voice data extraction section 230 extracts voice data corresponding to the destination ID and the statement ID received from another game device from the storage section 500, causes the sound generation section 250 to reproduce the voice data, and causes the sound output section 350 to output the reproduced voice.

The voice recognition section 232 recognizes the words produced by the player from the sound collected by the voice input section 110, and outputs the recognized words as text data. The voice recognition section 232 may be implemented by appropriately utilizing known voice recognition technology.

The sound generation section 250 is implemented by a processor such as a digital signal processor (DSP) and its control program. The sound generation section 250 generates a sound signal based on sound source/voice data such as a game-related effect sound, BGM, an operation sound, destination voice data, and statement voice data based on the processing results of the game calculation section 210, and outputs the generated sound signal to the sound output section 350.

The sound output section 350 is implemented by a device that outputs a sound such as an effect sound or BGM based on the sound signal output from the sound generation section 250. In FIG. 2, the speaker 1324 and the headphone 1374 of the headset 1370 correspond to the sound output section 350.

The image generation section 260 is implemented by a processor such as a GPU or a digital signal processor (DSP), its control program, a drawing frame IC memory such as a frame buffer, and the like. For example, the image generation section 260 generates a game image every frame (1/60th of a second) based on the processing results of the game calculation section 210, and outputs an image signal of the generated game image to the image display section 360.

The image display section 360 displays a game image based on the image signal output from the image generation section 260. The image display section 360 may be implemented by an image display device such as a flat panel display, a cathode-ray tube (CRT), a projector, or a head mount display. In FIG. 2, the video monitor 1322 corresponds to the image display section 360.

The communication control section 270 performs a data communication process, and exchanges data with an external device (another game device in this embodiment) through the communication section 370.

The communication section 370 connects with a communication channel 2 to implement communications. The communication section 370 is implemented by a transceiver, a modem, a terminal adapter (TA), a jack for a communication cable, a control circuit, and the like. In FIG. 2, the communication device 1312 corresponds to the communication section 370.

The storage section 500 stores a system program that implements a function of causing the processing section 200 to control the arcade game device 1300, a game program and data necessary for causing the processing section 200 to execute the game, and the like. The storage section 500 is used as a work area for the processing section 200, and temporarily stores the results of calculations performed by the processing section 200 based on a program, data input from the operation section 100, and the like. The function of the storage section 500 is implemented by an IC memory (e.g., RAM or ROM), a magnetic disk (e.g., hard disk), an optical disk (e.g., CD-ROM or DVD), a magnetic card, an IC card, or the like.

In this embodiment, the storage section 500 stores a system program 501 and a game program 502. The game program 502 includes a voice recognition program 504 as middleware. The processing section 200 reads and executes the game program 502 to implement the function of the game calculation section 210.

The storage section 500 stores game space setting data 510, character setting data 512, voice recognition dictionary data 514, area setting data 516, a sender name voice library 518, a destination voice library 520, an area name voice library 521, a statement reproduction effect sound library 522, a statement set selection condition TBL (table) 524, and a statement set library 526 as data provided in advance.

The storage section 500 also stores matching data 530, game state data 540, input voice text history 550, and statement transmission data 552 as data appropriately generated or rewritten during the game. The storage section 500 also stores a timer value, a parameter, or the like that is appropriately required when performing the game process.

The game space setting data 510 includes data for forming the game space 10 in the virtual three-dimensional space. For example, the game space setting data 510 includes model data and texture data that represent the boundary of the game space 10, the obstacle 12, the bases 14a and 14b, and the like. The game space setting data 510 also includes motion data depending on the setting.

The character setting data 512 includes model data, texture data, and motion data that represent the player's characters 20a to 20d and 22a to 22d, and parameter (e.g., hit point) initial setting data.

The voice recognition dictionary data 514 is dictionary data used to recognize a voice. In this embodiment, since the start of the statement is determined, the sender is identified, the destination is specified, the statement type is specified, and the end of the statement is determined based on a keyword, necessary keywords are registered in advance. For example, keywords "No. 1" to "No. 8" are set as the statement start keyword/sender identification keyword 50. A keyword that is the combination of the name of each player's character and a preposition or verb (e.g., "to the player's character No. 1", "the player's character No. 1 is", or "the player's character No. 1 performs") is set as the destination identification keyword 52.

Figures 9, 10:
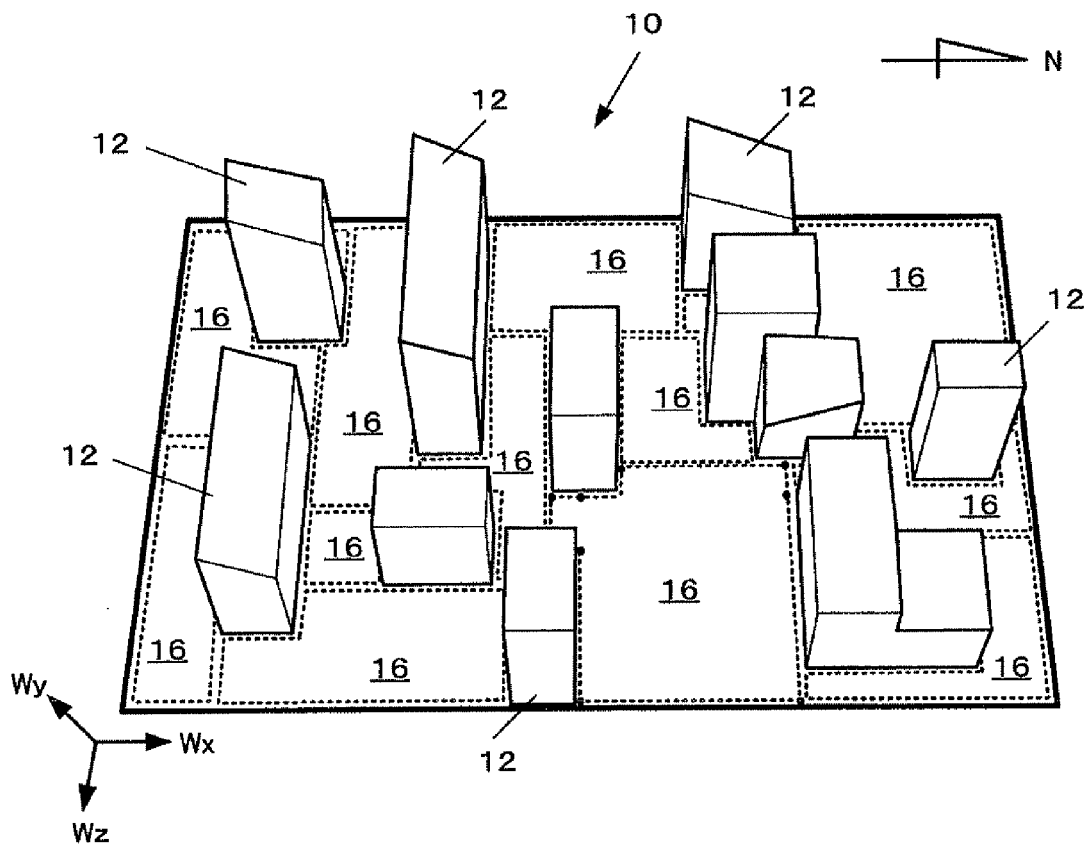
FIG. 9 is a view showing a game space area setting concept.
FIG. 10 is a view showing a data configuration example of area setting data.

The area setting data 516 includes a name that is set corresponding to a given area of the game space 10 in the game. For example, position coordinates 516a and an area ID 516b (see FIG. 10) are stored corresponding to each area 16 enclosed by a broken line (see FIG. 9). The position coordinates 516a indicate the position coordinates of a point included in the periphery of each area. The position coordinates 516a may be a function that defines the contour and the position of the origin of each area.

The sender name voice library 518 stores voice data that indicates the sender of a statement when reproducing the statement based on the statement ID received from another game device corresponding to each character type that can be selected by each player.

Figure 11:
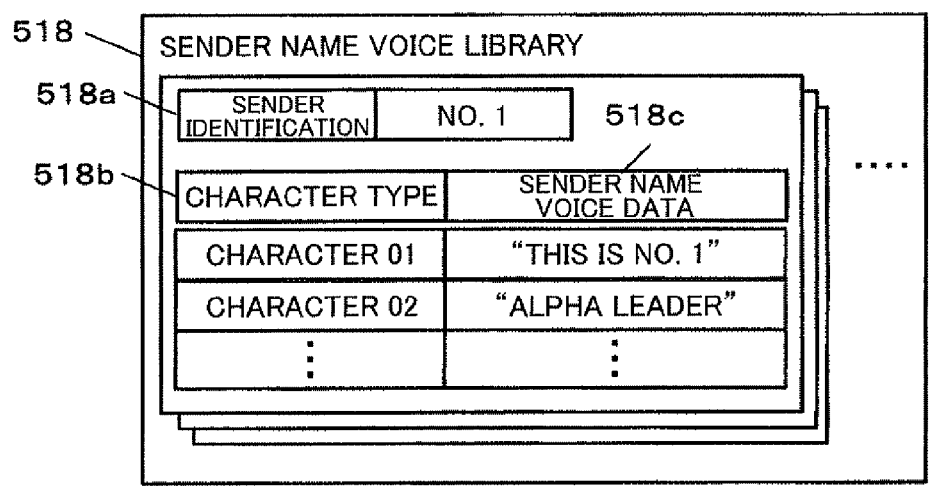
FIG. 11 is a view showing a data configuration example of a sender name voice library.

As shown in FIG. 11, the sender name voice library 518 stores sender name voice data 518c corresponding to each character type 518b corresponding to a sender identification data 518a ("No. 1" to "No. 8"), for example. In the example shown in FIG. 11, when the arcade game device 1300-1 ("No. 1") is the sender of the statement and the player who operates the arcade game device 1300-1 has selected a character 01, a voice "This is No. 1" is reproduced when the statement is reproduced. When the arcade game device 1300-1 ("No. 1") is the sender of the statement and the player who operates the arcade game device 1300-1 has selected a character 02, a voice "alpha leader" is reproduced when the statement is reproduced. Specifically, since the name voice corresponding to the character can be used even if the sender is the same, a radio communication from the character that appears in the movie can be produced.

Figure 12:
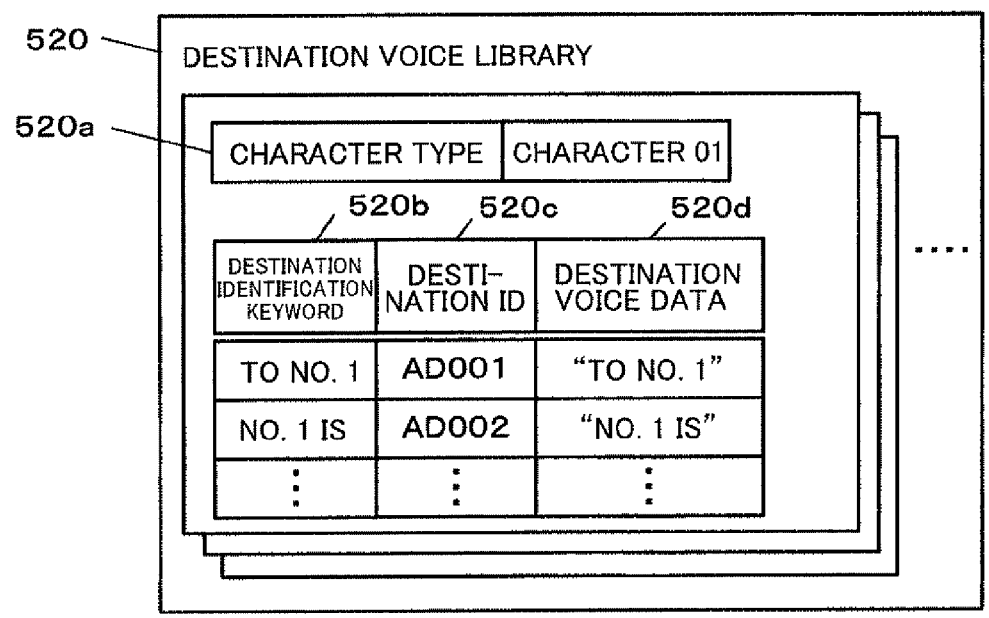
FIG. 12 is a view showing a data configuration example of a destination voice library.

As shown in FIG. 12, the destination voice library 520 stores a destination identification keyword 520b, a destination ID 520c, and destination voice data 520d that indicates the name of the destination player's character corresponding to each character type 520a, for example.

The destination identification keyword 520b is compared with an input voice text obtained by a voice recognition process to determine applicability. A voice of an actor who reads out the name of each player's character and a preposition or verb (e.g., "to the player's character No. 1", "the player's character No. 1 is", or "the player's character No. 1 performs") is set as the destination voice data 520d.

Figure 13:
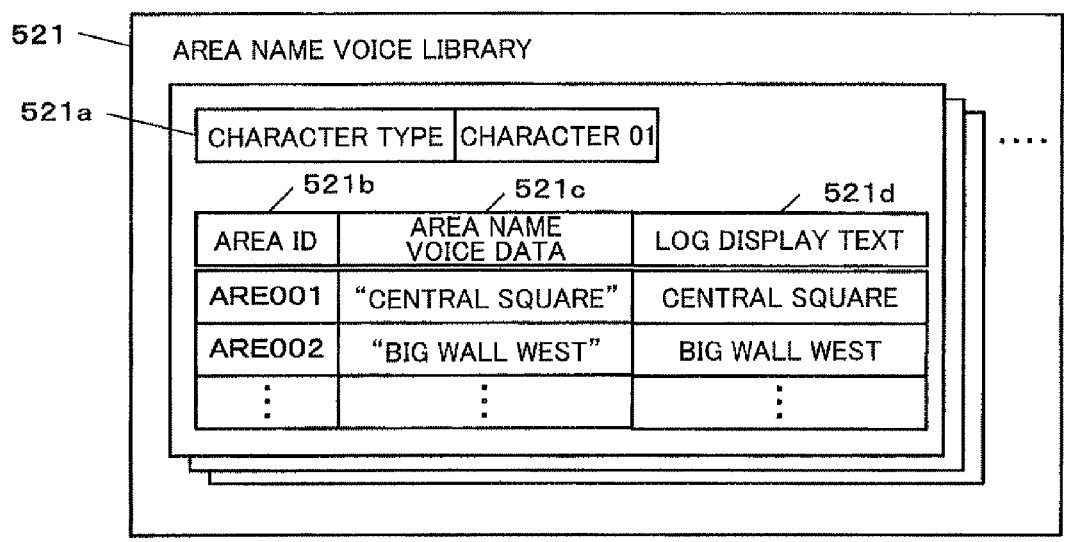
FIG. 13 is a view showing a data configuration example of an area name voice library.

The area name voice library 521 stores voice data that reads out each area defined by the area setting data 516. As shown in FIG. 13, the area name voice library 521 stores an area ID 521b, area name voice data 521c that indicates voice data when an actor reads out the name of the area, and a log display text 521d displayed as a statement text 42 in the statement log display section 40 (see FIG. 4) corresponding to each character type 521a, for example.

Figure 14:
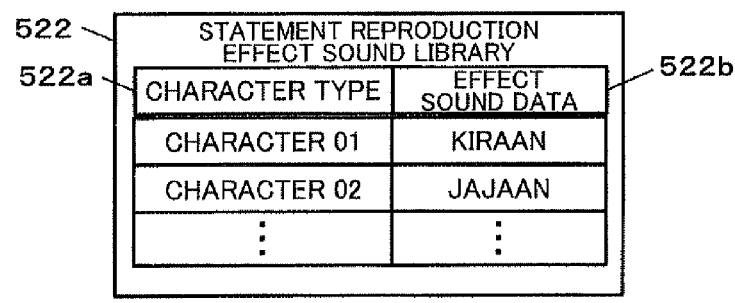
FIG. 14 is a view showing a data configuration example of a statement reproduction effect sound library.

As shown in FIG. 14, the statement reproduction effect sound library 522 stores effect sound data 522b that is reproduced between pieces of voice data corresponding to each character type 522a so that the player is not aware of a silent time that occurs until the subsequent voice data is reproduced or the difference in interval, for example.

For example, when a voice "This is No. 3" and a voice "I'll back you up!" are successively reproduced, the player may be aware of a silent time or the difference in voice that occurs during reproduction. A situation in which such a silent time occurs can be prevented by reproducing the effect sound data 522b to overlap the reproduced voice. The effect sound is set corresponding to each character type.

The statement set selection condition TBL 524 is provided in advance corresponding to each character type that can be selected by the player. As shown in FIG. 15, the statement set selection condition TBL 524 stores a statement set selection condition 524b and a statement set ID 524c corresponding to each character type 524a, for example.

In this embodiment, a combination of various parameters that indicate the game state and the like is set as the set selection condition 524b. Example of the parameters include the current hit point of the player's character, the situation index, the game play time, the presence or absence of an enemy within the field of view or the attack range, identification of the player's game device, and the like. Note that the parameters are not limited thereto.

For example, when the presence or absence of an enemy is included in the parameters, the presence or absence of a given enemy character (e.g., "tank", "sniper", or "Red Cross") may be included in the parameters. In the example shown in FIG. 15, a statement set "MST006" (statement set ID 524c) is selected when an enemy tank is positioned within the field of view. However, the statement set "MST006" is not selected even if an enemy character other than the enemy tank is positioned within the field of view. When the game is an action shooting game (as in this embodiment), the type of game space, a mission number, a scenario number, whether or not the player's character possesses a given item, whether or not a given event has been cleared, the number of NPCs that participate in the team, and the like may be included in the parameters.

The statement selection/transmission control section 216 refers to the statement set selection condition TBL 524 when the type of the player's character coincides with the character type 524a after a chat has started, selects the statement set ID 524c corresponding to the set selection condition 524b satisfied by the current game state, and displays the candidate display text of the selected statement set in the statement candidate display section 60 (statement set automatic selection process).

For example, since a statement set "MST001" (statement set ID 524c) includes a basic response, the statement set "MST001" is selected when the player's character is other than the player's character No. 1. Therefore, the statement set "MST001" may be substantially necessarily selected during the game. A statement set "MST002" (statement set ID 524c) includes a statement that discusses the team strategy in the initial stage. Therefore, the statement set "MST002" can be selected when the time elapsed after the game has started is within two minutes. The statement set "MST002" is not selected when two minutes has elapsed after the game has started.

The statement set library 526 stores a number of statement sets 527 corresponding to the statement set ID 524c. As shown in FIGS. 16 to 18, the statement set 527 stored in the library is provided corresponding to each statement set ID 527a, for example. A statement identification keyword 527b, a detailed selection condition 527c, a statement ID 527d, statement voice data 527e, a candidate display text 527f, and a log display text 527g are stored as the statement set 527. As shown in FIG. 18, additional information ID 527h may be stored as the statement set.

The statement identification keyword 527b and the detailed selection condition 527c correspond to conditions for selecting the statement classified into the set.

The statement identification keyword 527b defines a condition for the keyword compared with a text (input voice text) determined by the voice recognition process. A plurality of keywords may be defined using a logical expression. In this embodiment, the statement identification keyword 527b is defined using a logical expression in the order of keywords recognized. For example, the logical expression "enemy∩tank∩found" shown in FIG. 18 indicates that keywords "enemy", "tank", and "found" are recognized in this order.

The detailed selection condition 527c defines a refinement condition for the statement identification keyword 527b. A condition "none" set as the detailed selection condition 527c is a condition whereby the log display text is selected when other conditions are not satisfied.

For example, the detailed selection condition 527c of the statement corresponding to the statement identification keyword 527b "OK" and "roger" shown in FIG. 16 includes a condition "cumulative play count as friend is five or more". Specifically, a condition whereby it is determined that the degree of closeness between the player and another player is high (e.g., another player has played as a teammate five times or more). In this case, a friendly statement "OK. Leave it to me" is set corresponding to the condition "cumulative play count as friend is five or more" while a general statement "roger" is set when the condition "none" is set as the detailed selection condition 527c. Therefore, the statement of the player becomes more friendly when the player has played the game with the same player (friendship and trust are developed).

The statement voice data 527e is voice data of the statement read out by an actor.

The candidate display text 527f is text data displayed in the statement candidate display section 60 of the game screen.

The log display text 527g is text data displayed in the statement log display section 40 of the game screen.

The additional information ID 527h defines the type of information added when transmitting the statement ID 527d to another game device. In this embodiment, information about the current position of the player's character in the game space (FIG. 18) or information about the position of another player's character that is positioned within the field of view of the player's character and is selected or locked on is set as the additional information ID 527h.

Note that information about the position or the number of items or specific targets (e.g., a guard target NPC (e.g., magazine or warehouse), or a NPC of a supply vehicle or reconnaissance plane), the moving direction of the character, or the like may be set as the additional information ID 527h.

The matching data 530 is created by a matching process.

As shown in FIG. 19, a character identification keyword 530b, an IP address 530c that corresponds to the data transmission destination information of the arcade game device 1300, and a friend/enemy identification data 530d are stored as the matching data 530 corresponding to a player's character ID 530a, for example. Text data that can be compared with the input voice text obtained by the voice recognition process is set as the character identification keyword 530b.

A player ID 530e, a character type 530f, a cumulative play count 530g, and a cumulative match count 530h are acquired from the player information about the player who uses the communication destination arcade game device 1300 along with the matching process, and stored corresponding to the player's character ID 530a.

Various parameters that indicate the game state during game play are stored as the game state data 540. In this embodiment, a play time 542, a situation index 544, and character status data 546 are stored as the game state data 540, for example. A hit point information, available weapon list information, weapon state information (e.g., the number of remaining bullets), item list information, received statement information (e.g., the order of reception and the received statement ID), and the like are stored as the character status data 546 (i.e., parameters that indicate the current state of each character).

A constant amount of text recognized by the voice recognition process is stored as the input voice text history 550 in the order of the text recognized.

Various type of chat statement data before transmission (i.e., statement data that is subsequently transmitted) is temporarily stored as the statement transmission data 552. In this embodiment, a destination ID 552a, a statement ID 552b, and additional information 552c are stored as the statement transmission data 552. Position coordinates, a number, and the like are appropriately stored as the additional information 552c.

Operation

The operation of the arcade game device 1300 according to this embodiment is described below.

Figure 20:
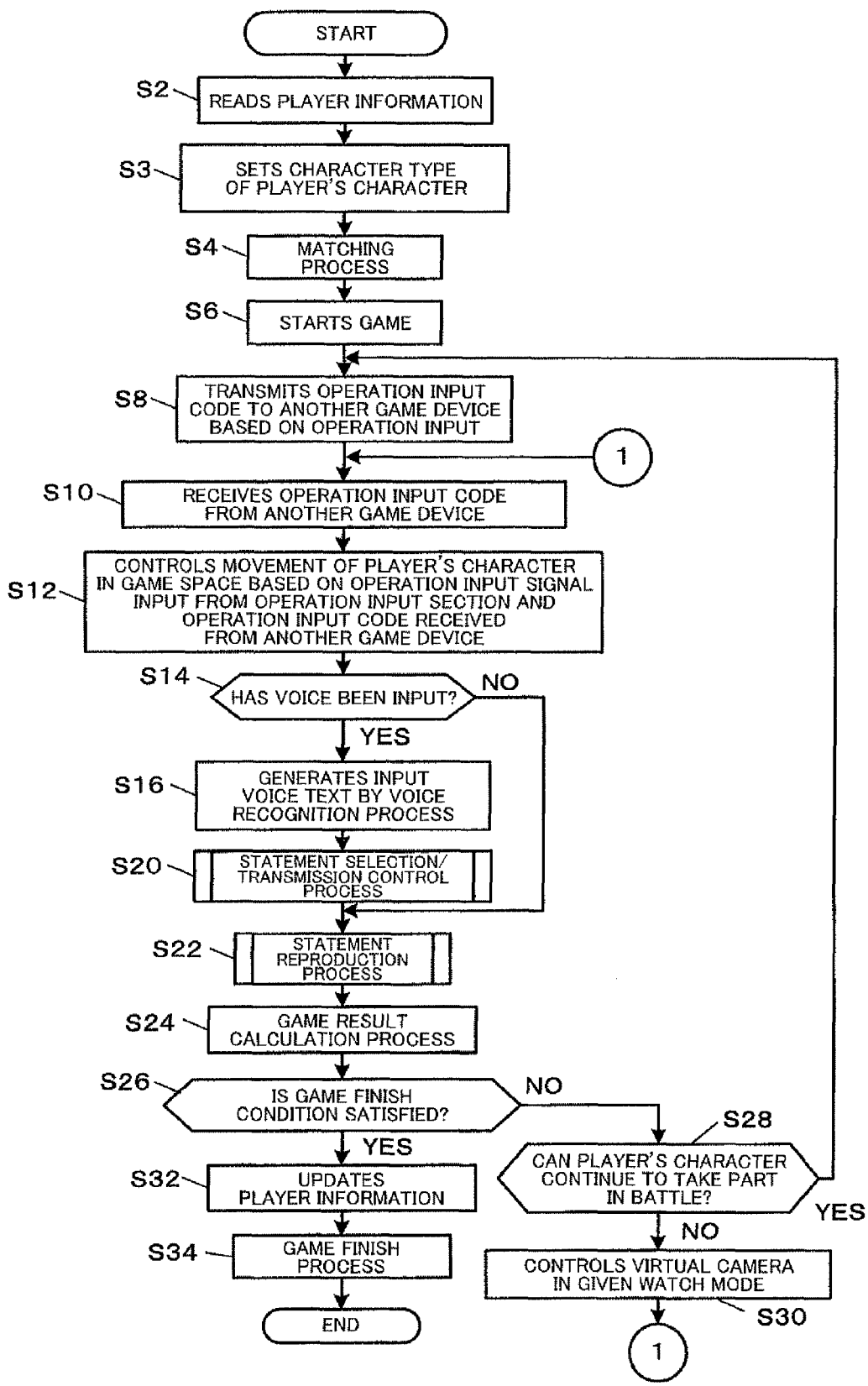
FIG. 20 is a flowchart illustrative of the flow of a process executed by each arcade game device during an online multi-player game.

FIG. 20 is a flowchart illustrative of the flow of a process executed by each arcade game device 1300 during the online multi-player game. The following process is implemented by causing the processing section 200 to read and execute the system program 501 and the game program 502.

A process that generates and synthesizes an image of the game space 10 photographed by the virtual camera from the first person point of view of the player's character and information displayed in the game screen (erg., map display section 32) and displays the image on the image display section 360 is performed in a given cycle in the same manner as in a known video game. Therefore, description thereof is omitted. This also applies to generation of a game sound (e.g., BGM and ambient sound) and sound output control of the sound output section 350.

The processing section 200 reads the player information 142 stored in the portable information storage medium 140 through the information storage medium reader/writer section 130 (step S2), and sets the character type of the player's character in the same manner as in a known online multi-player game (step S3). The processing section 200 may set the character type 148 of the player information 142 that has been previously read.

The processing section 200 then executes the matching process (step S4). The matching process may be implemented in the same manner as in a known online multi-player game. The processing section 200 generates the matching data 530 and stores the matching data 530 in the storage section 500.

The processing section 200 then forms the game space 10 in the virtual three-dimensional space, disposes the player's characters 20a to 20d and 22a to 22d, initializes the game state data 540, and starts the game (step S6). The processing section 200 then transmits the operation input code to another game device that has been matched based on the operation input signal input from the operation input section 100 (step S8). The processing section 200 receives the operation input code transmitted from another game device in a similar manner (step S10).

The processing section 200 controls the movement and the motion (e.g., attack) of each of the player's characters 20a to 20d and 22a to 22d in the game space 10 based on the operation input signal input from the operation input section 100 and the operation input code received from another game device (step S12).

The processing section 200 then determines whether or not a sound at a sound pressure level equal to or higher than a given sound pressure level from the voice input section 110 (step S14). When the processing section 200 has determined that a sound at a sound pressure level equal to or higher than a given sound pressure level has been input from the voice input section 110 (YES in step S14), the processing section 200 recognizes the input voice by the voice recognition process to generate text data, and stores the generated text data in the storage section 500 as the input voice text history 550 (step S16). The processing section 200 then executes a statement selection/transmission control process (step S20).

Figure 21:
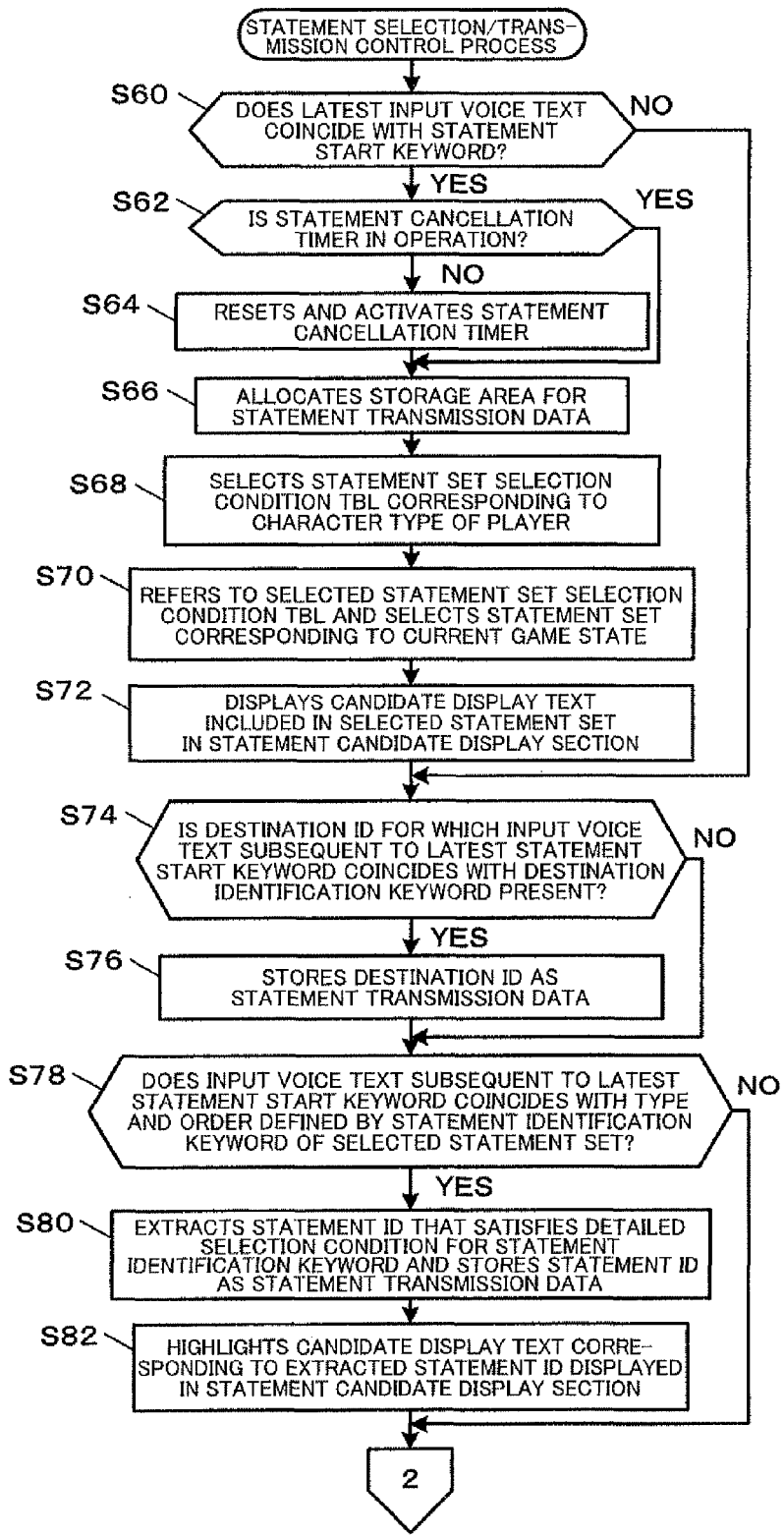
FIG. 21 is a flowchart illustrative of the flow of a statement selection/transmission control process.
Figure 22:
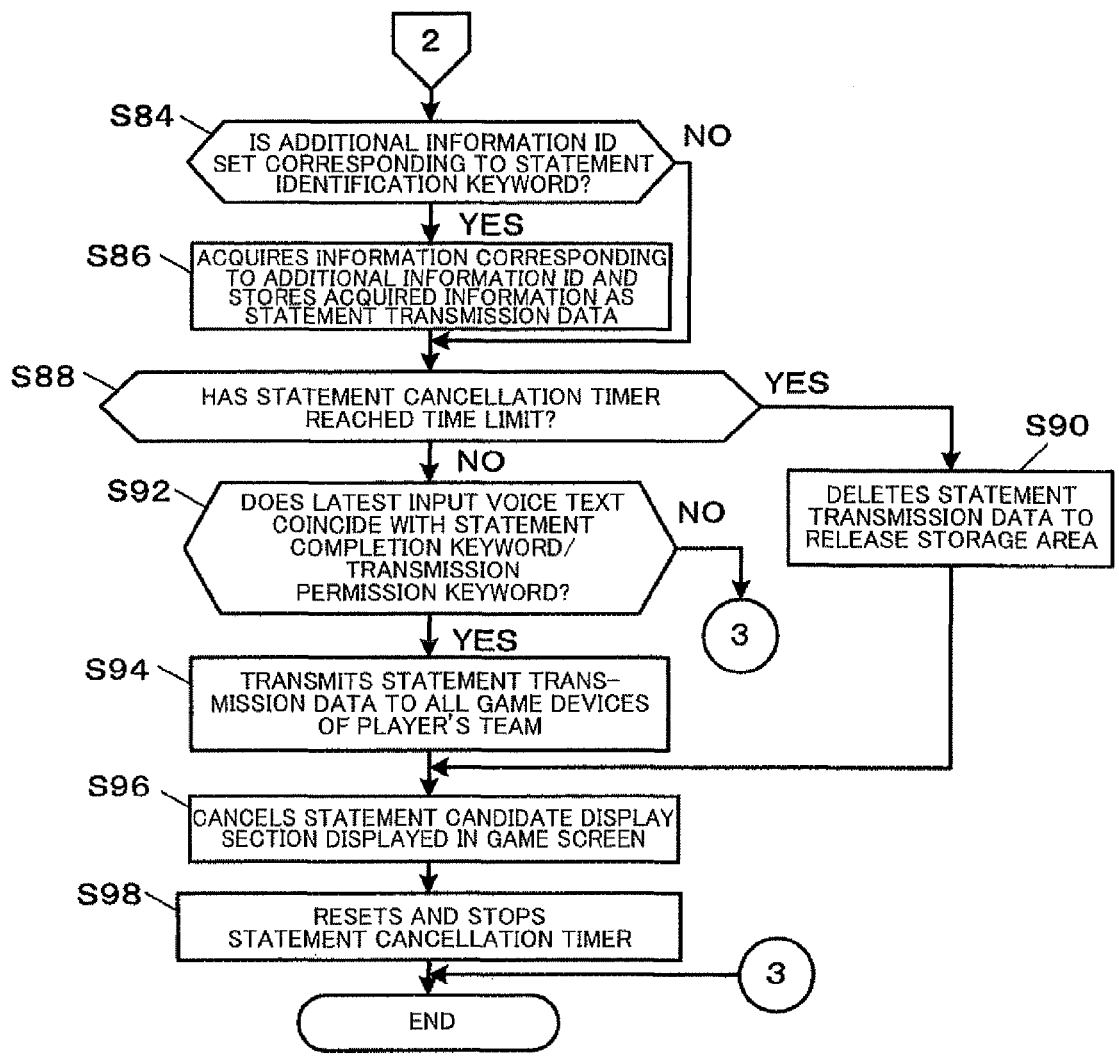
FIG. 22 is a flowchart illustrative of the flow of a statement selection/transmission control process.

FIGS. 21 to 22 are flowcharts illustrative of the flow of the statement selection/transmission control process according to this embodiment.

In the statement selection/transmission control process, the processing section 200 refers to the input voice text history 550, and determines whether or not the latest input voice text obtained by the voice recognition process coincides with the statement start keyword/sender identification keyword 50 (step S60). In this embodiment, the character identification keyword 530b (i.e., a text that indicates the name of the player's character ID 530a set corresponding to the game device in the matching data 530) is used as the statement start keyword/sender identification keyword 50.

When the processing section 200 has determined that the latest input voice text coincides with the statement start keyword/sender identification keyword 50 (YES in step S60), the processing section 200 checks the operation of a statement cancellation timer. When the statement cancellation timer does not operate (NO in step S62), the processing section 200 resets and activates the statement cancellation timer (step S64). When the statement cancellation timer is in operation, the processing section 200 omits the step S64.

The processing section 200 then allocates a storage area for the statement transmission data 552 in the storage section 500 (step S66).

The processing section 200 selects the statement set selection condition TBL 524 (see FIG. 15) corresponding to the character type 148 of the player information 142 about the player as the statement set automatic selection process (step S68). The processing section 200 refers to the game state data 540 and the selected statement set selection condition TBL 524, and selects the statement set ID 524c corresponding to the current game state from the statement set library 526 (step S70). In this case, the processing section 200 selects all of the statement sets that satisfy the set selection condition 524b.

The processing section 200 then extracts the statement set 527 (see FIGS. 16 to 18) corresponding to the selected statement set ID 524c from the statement set library 526, and displays all of the candidate display texts 527f included in the extracted statement set 527 in the statement candidate display section 60 that is displayed as a pop-up menu in the game screen (step S72). This stage corresponds to (1) in FIG. 6.

The processing section 200 then refers to the input voice text history 550, extracts the input voice text subsequent to the latest statement start keyword/sender identification keyword 50, compares the input voice text with the destination identification keyword 520b of the destination voice library 520 corresponding to the character type 148 of the player, and determines the presence or absence of the destination ID 520c with which the destination identification keyword 520b coincides (step S74). In this embodiment, since the second keyword of the statement is used as the destination identification keyword, the processing section 200 determines the presence or absence of the destination ID 520c using the input voice text that follows the latest statement start keyword/sender identification keyword 50.

When the destination ID 520c is present (YES in step S74), the processing section 200 stores the destination ID 520c as the destination ID 552a stored as the statement transmission data 552 (step S76). Note that the processing section 200 extracts all of the destination IDs 520c that satisfy the above condition referring to the destination voice library 520. For example, when the player has stated that "No. 1 and No. 2 . . . ", the destination ID 520c corresponding to "No. 1 and No. 2" is extracted. However, the destination ID 520c may be extracted corresponding to each of "No. 1" and "No. 2" and stored as the statement transmission data 552.

The processing section 200 then refers to the input voice text history 550, extracts the input voice text that is stored subsequent to the latest statement start keyword/sender identification keyword 50 and destination identification keyword 52, compares the input voice text with the keyword defined by the statement identification keyword 527b of the statement set 527 selected in the step S70 and the order condition, and extracts the keyword that satisfies the condition (step S78).

When the input voice text coincides with the statement identification keyword 527b (YES in step S78), the processing section 200 refers to the detailed selection condition 527c corresponding to the statement identification keyword 527b, extracts the statement ID 527d that satisfies the detailed selection condition 527c, and stores the statement ID 527d as the statement transmission data 552 (step S80). One statement is thus temporarily selected.

The processing section 200 highlights the text corresponding to the selected statement ID 527d included in the candidate display text 61 displayed in the statement candidate display section 60 (step S82).

When the additional information ID 527h is set corresponding to the statement identification keyword 527b (YES in step S84), the processing section 200 acquires information corresponding to the set additional information ID 527h, and stores the acquired information as the statement transmission data 552 (step S86). This stage corresponds to (2) in FIG. 6.

The information corresponding to the additional information ID 527h may be the current position of the player's character, or the current position of another player's character or an item that is positioned within the field of view and has been selected or locked on.

The processing section 200 then determines whether or not the statement cancellation timer has reached a given time limit (e.g., about 3 to 5 seconds) (step S88). When the statement cancellation timer has reached the time limit (YES in step S88), the processing section 200 determines that the current statement has been canceled (i.e., since a long time has elapsed after the statement start keyword/sender identification keyword 50 has been recognized and the processing section 200 has determined that the player has started the statement), and deletes statement transmission data 552 stored in the storage section 500 to release the storage area (step S90). The processing section 200 then cancels the statement candidate display section 60 displayed in the game screen (step S96), stops and resets the statement cancellation timer (step S98), and finishes the statement selection/transmission control process.

When the statement cancellation timer has not reached the time limit (NO in step S88) and the latest input voice text stored in the input voice text history 550 coincides with a given statement completion keyword/transmission permission keyword 56 (YES in step S92), the processing section 200 transmits the statement transmission data 552 to all of the game devices of the player's team (step S94), and cancels the statement candidate display section 60 displayed in the game screen (step S96). Note that a header including sender identification information and the like is added to the statement transmission data 552 in the same manner as in data communication in a known online multi-player game or the like.

When the processing section 200 has transmitted the statement transmission data 552, the processing section 200 stops and resets the statement cancellation timer (step S98), and finishes the statement selection/transmission control process.

Again referring to the flowchart shown in FIG. 20, the processing section 200 then executes a statement reproduction process (step S22).

Figure 23:
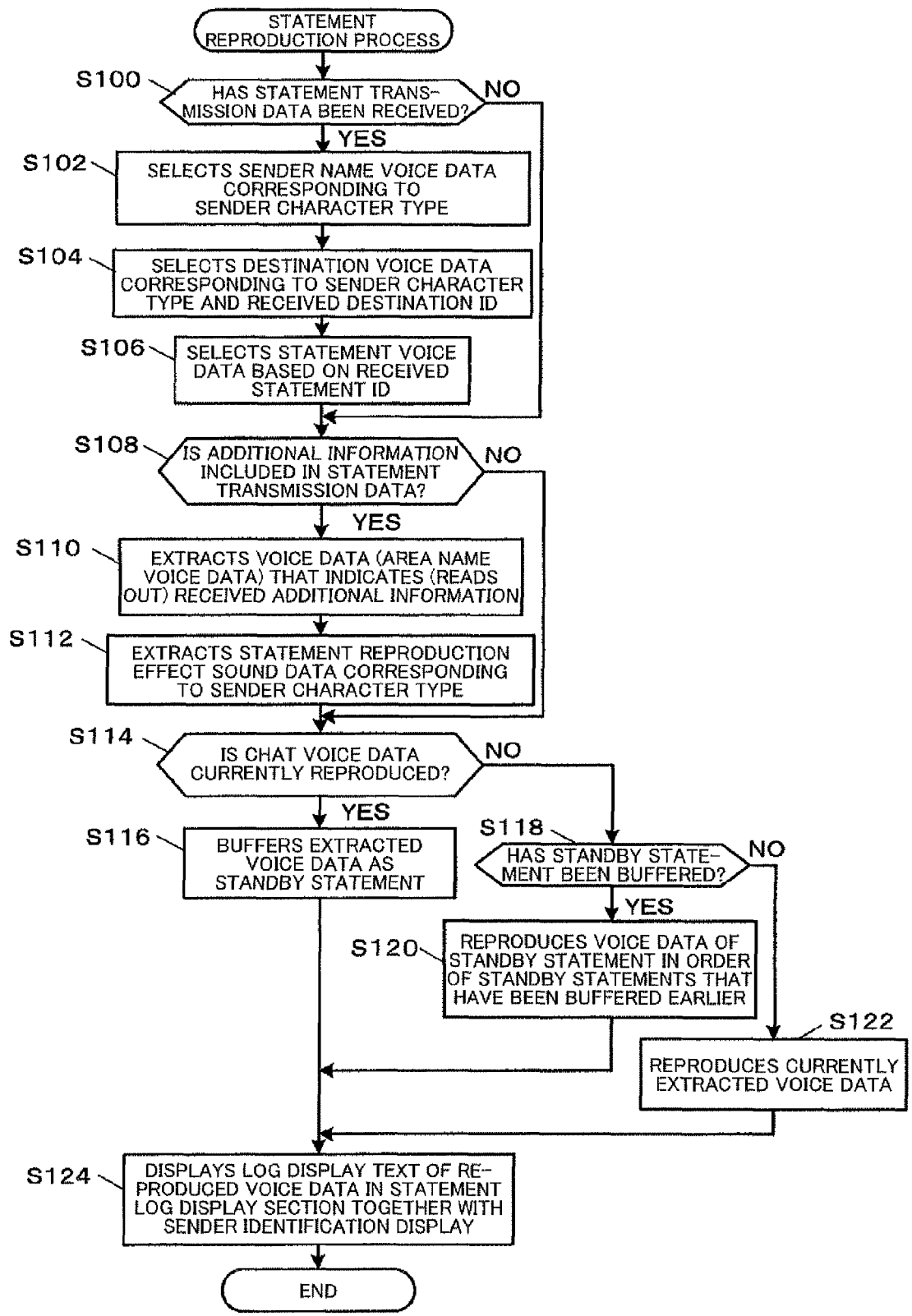
FIG. 23 is a flowchart illustrative of the flow of a statement reproduction process.

FIG. 23 is a flowchart illustrative of the flow of the statement reproduction process according to this embodiment. As shown in FIG. 23, the processing section 200 determines whether or not the statement transmission data 552 has been received from another game device (step S100). When the statement transmission data 552 has been received from another game device (YES in step S100), the processing section 200 refers to the sender name voice library 518, and extracts the sender name voice data 518c corresponding to the sender identification data 518a (step S102).

Specifically, the processing section 200 refers to the matching data 530, extracts the character identification keyword 530b that corresponds to the sender IP address included in the header of the received statement transmission data 552, and selects the data set for which the extracted character identification keyword 530b coincides with the sender identification data 518a from the sender name voice library 518 (see FIG. 11). The processing section 200 refers to the matching data 530, and extracts the sender name voice data 518c corresponding to the character type 530f corresponding to the sender IP address.

The processing section 200 then refers to the destination voice library 520, searches for the destination ID 520c that coincides with the destination ID 552c included in the received sender data 522, and extracts the destination voice data 520d corresponding to the destination ID 520c (step S104). The processing section 200 then refers to the statement set 527 (FIGS. 16 to 18) included in the statement set library 526, searches for the statement ID 527d that coincides with the statement ID 552b included in the received sender data 522, and extracts the statement voice data 527e corresponding to the statement ID 527d (step S106).

When the additional information 552c is included in the received statement transmission data 552 (YES in step S108), the processing section 200 extracts the voice data that indicates (reads out) the additional information 552c (step S110).

In this embodiment, the current position coordinates of the player's character, another player's character, or the like are stored as the additional information 552c. When the additional information 552c indicates position coordinates, the processing section 200 refers to the area setting data 516, and acquires the area ID 516b of the area 16 that corresponds to the position coordinates indicated by the received additional information 552c. The processing section 200 then extracts the area name voice data 521c that corresponds to the character type of the sender and corresponds to the acquired area ID from the area name voice library 521 (see FIG. 13).

Note that a number, a direction, or the like may be set as the additional information 552c. In this case, a voice library similar to the area name voice library 521 may be provided corresponding to each parameter, and the voice data of an actor corresponding to the character type of the sender may be selected from the voice library corresponding to the type of information stored as the additional information 552c of the received statement transmission data 552.

When the processing section 200 has extracted the voice data corresponding to the additional information 552c, the processing section 200 refers to the matching data 530 (see FIG. 19) for the character type 530f of the sender of the received statement transmission data 552, and extracts the effect sound data 522b set corresponding to the character type 530f from the statement reproduction effect sound library 522 (step S112).

The processing section 200 then determines whether or not chat voice data is currently reproduced (step S114). When the statement transmission data 552 has been received and the voice data of the statement is currently reproduced (YES in step S114), the processing section 200 buffers the extracted voice data or the like in the storage section 500 as a reproduction standby statement (step S116).

When voice data is not currently reproduced (NO in step S114) and the standby statement has been buffered (YES in step S118), the processing section 200 reproduces the standby statement in the order of the standby statements that have been buffered earlier (step S120). The processing section 200 successively reproduces the sender name voice data 518c, the destination voice data 520d, the area name voice data 521c, and the statement voice data 527e in this order. In this case, the processing section 200 reproduces an effect sound based on the extracted effect sound data 522b between the sender name voice data 518c and the destination voice data 520d so that the effect sound overlaps the sender name voice data 518c and the destination voice data 520d. Note that the effect sound may be reproduced from reproduction of the sender name voice data 518c to the statement voice data 527e in the background depending on the length of the effect sound data 522b.

When no statement has been buffered (NO in step S118), the processing section 200 reproduces the currently extracted voice data (step S122).

The processing section 200 displays the sender identification display 44 in the statement log display section 40 of the game screen, displays the log display text 527g of the voice data that has been reproduced in the statement log display section 40 of the game screen as the statement text 42 (step S124), and finishes the statement reproduction process.

Again referring to the flowchart shown in FIG. 20, the processing section 200 then executes a game result calculation process (step S24). Specifically, the processing section 200 calculates the play time, determines whether or not the player's characters have hit, decrements the hit point when the player's character has been hit, changes the number of remaining bullets, calculates the situation index as the game result calculation process, and updates the game state data 540.

When the calculated game result does not satisfy a given game finish condition (NO in step S26), the processing section 200 determines whether or not the player's character can continue to take part in a battle (step S28). When the hit point of the player's character is not "0" the processing section 200 determines that the player's character can continue to take part in a battle (YES in step S28), and transitions to the step S8. When the processing section 200 has determined that the player's character cannot continue to take part in a battle (NO in step S28), the processing section 200 controls the game screen display virtual camera in a given watch mode in the same manner as in a known online multi-player game (step S30), and transitions to the step S10.

When the calculated game result satisfies the game finish condition (YES in step S26), the processing section 200 stores the match record based on the play result, and updates the player information 142 stored in the game card 1332 (step S32).

The processing section 200 executes a given game finish process (step S34), and finishes the online multi-player game process.

According to this embodiment, the player can take part in an in-team chat by speaking the identification information about the player's character (e.g., "No. 3") toward the microphone 1372 of the headset 1370 while operating the joystick 1306 and the push switch 1308 with both hands. This ensures high operability whereby the player need not interrupt the operation of the player's character for making a chat statement.

The statement corresponding to the current game state is selected after the player has made a statement, and displayed in the statement candidate display section 60 of the game screen. Therefore, a situation in which a number of statement candidates are unnecessarily displayed on the game screen can be prevented. In other words, since an appropriate statement is presented to the player even if the player does not memorize all possible statements, the game manufacturer can improve the quality of the game by setting a larger number of statements corresponding to various states.

Moreover, when the player has pronounced the keyword displayed in the statement candidate display section 60, the keyword is recognized, and the corresponding statement ID is automatically selected and transmitted to another game device. Therefore, the player need not make an accurate statement (accurate sentence). Since the player can speak in his own style as long as the player makes a statement including the keyword as if the player were the pilot of the player's character, the player is highly involved in the game.

Since the statement of another player is reproduced as actor's voice data recorded in advance, an ill-mannered statement (e.g., swearing) of the player is not reproduced. Therefore, ill-mannered statements can be substantially restricted.

This embodiment has been described above taking an example in which the destination of the statement transmission data 552 is limited to the players of the same team. Note that the statement transmission data 552 may be transmitted to the game devices of the opposing team.

Second Embodiment

A second embodiment to which the invention is applied is described below. This embodiment is basically configured in the same manner as the first embodiment, but differs from the first embodiment in that (1) the destination of the statement is specified by voice recognition and the statement transmission data 552 can be transmitted to a specific destination, (2) the specific destination is not limited to the game device of the player's team, but includes the game device of the opposing team, (3) an effect is applied to the reproduced voice data corresponding to the difference in team between the sender of the statement and the receiver/reproducer of the statement, and (4) situation words that indicate the speaker's mental state and emotional ups and downs are automatically added before and after the statement corresponding to the situation (e.g., war situation). The following description focuses on only the differences from the first embodiment. The same elements as in the first embodiment are indicated by the same symbols. Description of these elements is omitted.

Figure 24:
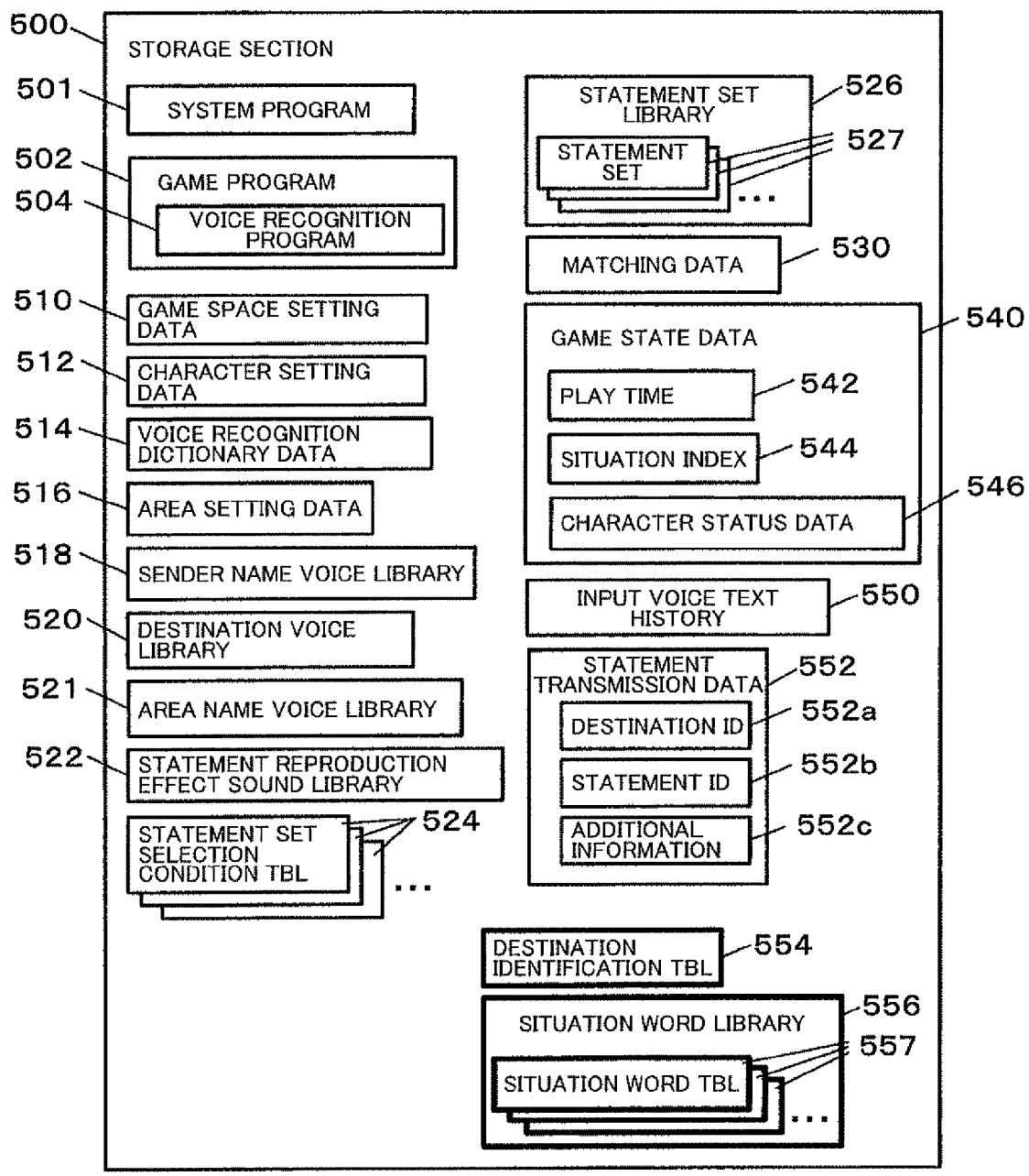
FIG. 24 is a block diagram showing a configuration example of a program and data stored in a storage section according to a second embodiment.

FIG. 24 is a block diagram showing a configuration example of a program and data stored in the storage section 500 according to this embodiment. As shown in FIG. 24, the storage section 500 according to this embodiment includes a destination identification TBL 554 and a situation word library 556 in addition to the functional configuration according to the first embodiment.

As shown in FIG. 25, the destination identification TBL 554 stores a destination identification keyword 554b and a player's character ID 554c corresponding to each player's character ID 554a, for example. In this embodiment, the player's character ID 554a is set corresponding to each team. Specifically, the destination identification TBL 554 is provided corresponding to each team. A keyword obtained by adding the preposition "to" to the name of the player's character (e.g., "to No. 1", "to No. 2", . . . , "to No. 8", and "to enemy") and a keyword obtained by adding the preposition "to" to the names of a plurality of player's characters (e.g., "to No. 1 and No. 2", "to No. 1 and No. 3", . . . , "to all members", and "to each member") are set as the destination identification keyword 554b. All of the other player's characters of the player's team are set corresponding to the keywords "to all members" and "to each member". The keyword "to enemy" means that the destination is another player's character selected by the player's character as a target or the nearby player's character positioned within the field of view. Specifically, since it is necessary to extract another player's character corresponding to the keyword "to enemy", a special ID ("PCE" in FIG. 25) is set corresponding to the keyword "to enemy".

As shown in FIG. 26, the situation word library 556 includes a situation word TBL 557 that is provided corresponding to each character that can be selected by the player in the game, for example.

The situation word TBL 557 includes a character type 557a that stores identification information about the character to which the situation word TBL 557 is applied. The situation word TBL 557 also includes a selection condition 557c, situation voice data 557d, and a log display text 557e corresponding to each target statement ID 557b that stores identification information about the statement type of the defined character.

As the selection condition 557c, the situation of the team, the character defined by the character type 557a (speaker) or the strength value of the machine of the character, the destination player's character or the strength value of the machine of the player's character, and the like may be appropriately set. The situation index 544 stored as the game state data 540 may be used as the situation parameter, or the number of characters of the opposing team positioned within a given range from the player's character defined by the character type 557a or the machine of the player's character may be calculated and used as the situation parameter.

The situation voice data 557d is voice data that records the voice of the actor who performs the character indicated by the character type 557a when the actor reads out the situation words of the log display text 557e. The term "situation words" refers to words that are added to the original statement and express a mental state or emotions.

Figure 27:
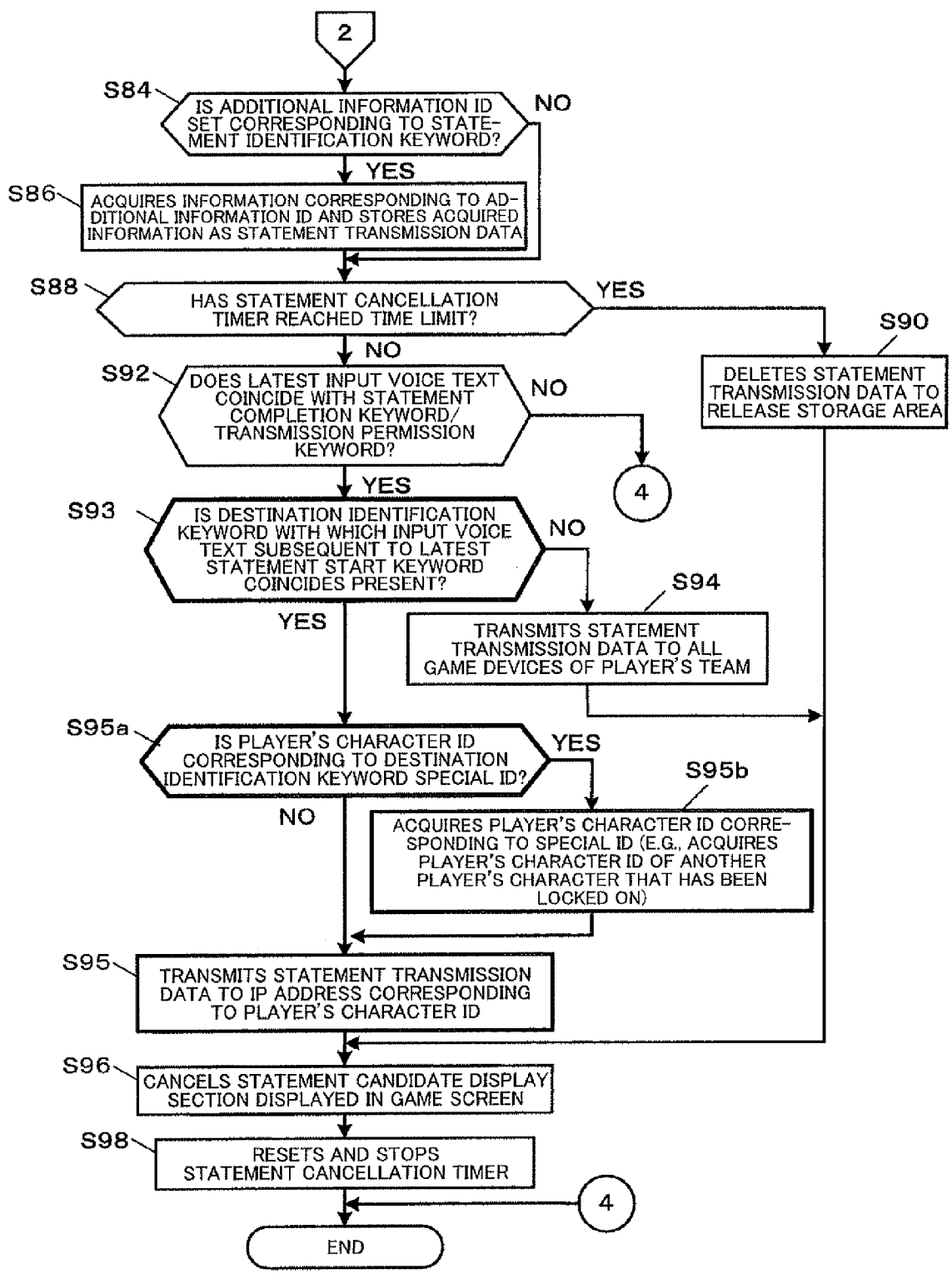
FIG. 27 is a flowchart illustrative of the flow of a statement selection/transmission control process according to a second embodiment.

FIG. 27 is a flowchart illustrative of the flow of the statement selection/transmission control process according to this embodiment. FIG. 27 corresponds to the flowchart shown in FIG. 22 according to the first embodiment.

The statement selection/transmission control process according to this embodiment is the same as that of the first embodiment up to the step S92. However, the processing section 200 refers to the destination identification TBL 554 for which the player's character ID coincides after the step S92, and determines the presence or absence of the destination identification keyword 554b with which the input voice text stored after the latest statement start keyword/sender identification keyword 50 (i.e, the input voice text subsequent to the statement completion keyword/transmission permission keyword 56 in this embodiment) coincides (step S93).

When the destination identification keyword 554b that satisfies the above condition is absent (NO in step S93), the processing section 200 executes the steps S94, S96, and S98 in the same manner as in the first embodiment, and finishes the statement selection/transmission control process. Specifically, if the player does not speak a destination identification keyword in which the preposition "to" is added to the name of the destination player's character (e.g., "to No. 3") the statement is transmitted to all of the members of the player's team in the same manner as the in-team communication (in-team chat) according to the first embodiment. When a verb is added to the name of the player's character (e.g., "No. 3 is" or "No. 3 performs") of the destination identification keyword, since the determination result in the step S93 is "NO", the player can make a statement that specifies the destination in the same manner as in the first embodiment.

When the destination identification keyword 554b that satisfies the above condition is present (YES in step S93), the processing section 200 determines whether or not the player's character ID 554c corresponding to the destination identification keyword 554b is the special ID (step S95a).

When the player's character ID 554c corresponding to the destination identification keyword 554b is the special ID (YES in step S95a), the processing section 200 acquires the player's character ID corresponding to the special ID (step S95b). In this embodiment, the processing section 200 again acquires the player's character ID of another player's character that has been selected as the attack target or locked on.

When the processing section 200 has again acquired the player's character ID or the acquired player's character ID 554c is not the special ID (NO in step S95a), the processing section 200 refers to the matching data 530, and transmits the statement transmission data 552 to the IP address 530c corresponding to the player's character ID that has been acquired or again acquired (step S95c). The processing section 200 then executes the steps S96 and S98 in the same manner as in the first embodiment, and finishes the statement selection/transmission control process.

Therefore, this embodiment achieves effects similar to those of the first embodiment. Moreover, the statement transmission data 552 can be transmitted to a specific game device in addition to the destination of the statement.

For example, when the team leader player ("No. 1") desires to make an instruction statement to the beginner player ("No. 3"), but does not desire that the other players of the team listen to the statement, the team leader player may state that "This is No. 1. To No. 3. What's up? Show your true ability!!". Since the keyword "To No. 3" of the statement corresponds to the destination identification keyword 554b defined by the destination identification TBL 554, the determination result in the step S93 is "YES". Therefore, the statement is selectively transmitted to the game device "No. 3". Since the keyword "To No. 3" is also set as the destination identification keyword 520b of the destination voice library 520 (see FIG. 12), the processing section 200 determines that the destination ID is present in the step S74 shown in FIG. 21. Therefore, since the destination ID 520c corresponding to the keyword "To No. 3" is stored as the statement transmission data 552 transmitted to the game device "No. 3", the destination voice data 520d is reproduced (e.g., "This is No. 1. To No. 3 . . . ") in the same manner as in the first embodiment.

Moreover, the destination of the statement is not limited to the player's character of the player's team (i.e., the statement can be transmitted to the player's character of the opposing team).

For example, when the player of the game device "No. 1" has stated that "This is No. 1. To enemy. I'll pay you back!", since the keyword "To enemy" of the statement corresponds to the destination identification keyword 554b defined by the destination identification TBL 554, the determination result in the step S93 is "YES". Therefore, the statement is selectively transmitted to the enemy game device (e.g., the nearby player's character of the opposing team positioned within the field of view). If the destination ID 520c and the destination voice data 520d corresponding to the keyword "To enemy" are set as the destination identification keyword 520b of the destination voice library 520, the statement "This is No. 1. To enemy . . . " can be reproduced. The player can enjoy a chivalrous act of yelling at the enemy, differing from an actual military radio, by enabling a statement to be selectively transmitted to the enemy.

Figure 28:
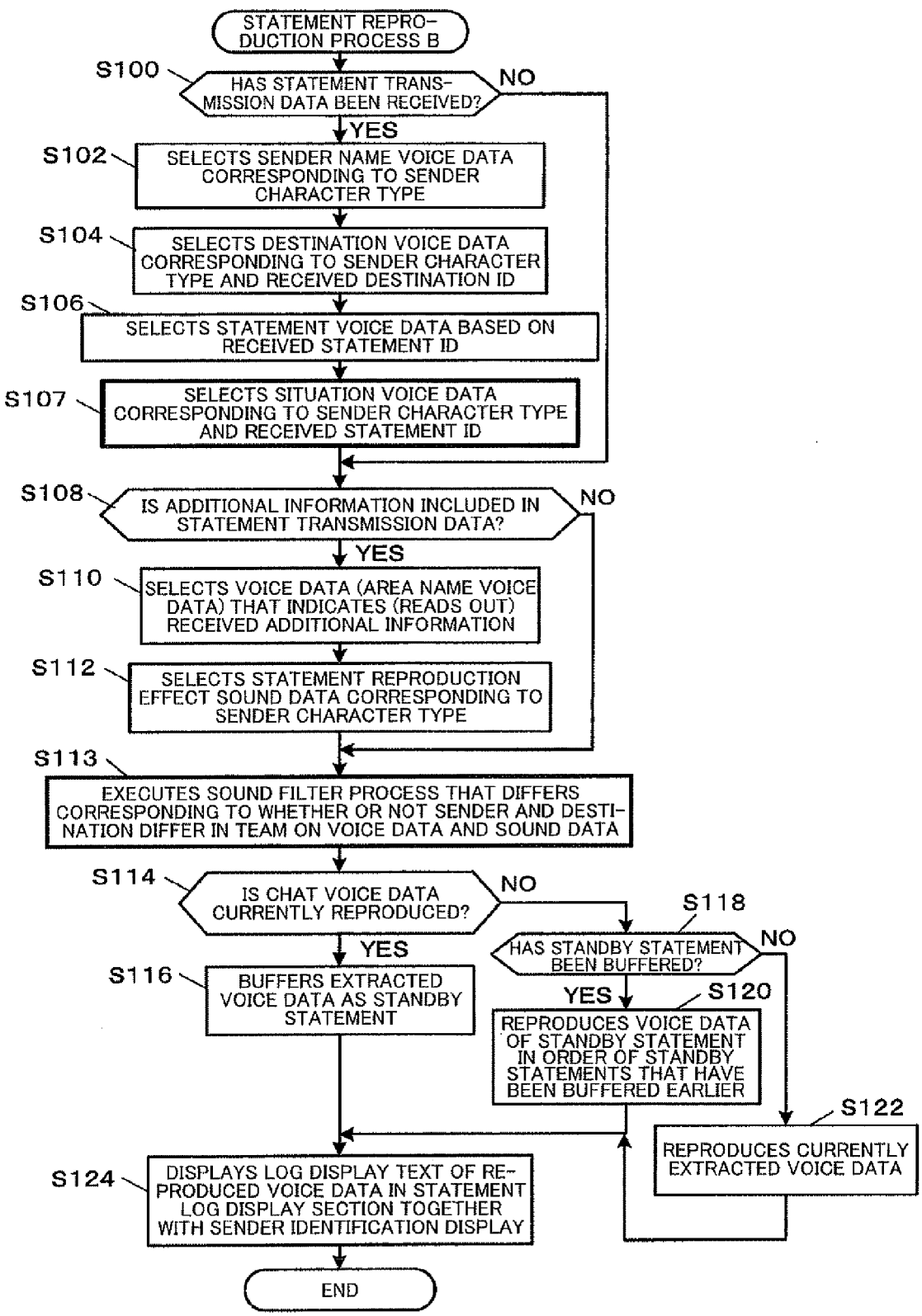
FIG. 28 is a flowchart illustrative of the flow of a statement reproduction process (statement reproduction process B) according to a second embodiment.

FIG. 28 is a flowchart illustrative of the flow of the statement reproduction process (statement reproduction process B) according to this embodiment. The flow of the statement reproduction process B is basically the same as that of the statement reproduction process according to the first embodiment. In the statement reproduction process B, however, the processing section 200 refers to the situation word library 556 after selecting the statement voice data based on the received statement ID 552b (step S106), and selects the situation voice data corresponding to the character type of the sender and the received statement ID 552b (step S107).

Specifically, the processing section 200 refers to the matching data 530 (see FIG. 19), and acquires the player's character ID 530a corresponding to the sender of the received statement transmit data. The processing section 200 selects the situation word TBL 557 for which the acquired player's character ID 530 coincides with the character type 557a from the situation voice library 556, and selects the target statement ID 557b with which the statement ID 552b included in the received statement transmission data coincides. The processing section 200 selects the selection condition 557c that corresponds to the target statement ID 557b and coincides with the current game state, and selects the situation voice data 557d corresponding to the selected selection condition 557c.

The processing section 200 selects statement reproduction effect sound data corresponding to the character type of the sender (step S112), and executes a sound filter process that differs corresponding to the difference in team between the sender and the destination of the statement on the voice data that has been selected (e.g., sender name voice data, destination voice data, statement voice data, situation voice data, area name voice data, and statement reproducing effect sound data) (step S113).

Specifically, a case where the sender and the destination of the statement differ in team corresponds to a situation in which the enemy's radio is intercepted. Therefore, the processing section 200 executes the sound filter process so that noise or a skip specific to wireless communications or noise or a change in interval that imitates compressed data extraction occurs, for example. On the other hand, when the sender and the destination of the statement belong to the same team, the communication state is better. Therefore, the processing section 200 executes the sound filter process so that noise or a skip occurs to a lesser extent.

The processing section 200 then buffers and reproduces the selected voice data in the same manner as in the statement reproduction process according to the first embodiment (steps S114 to S124). When reproducing the voice data, the situation voice data 557d is reproduced before or after the statement voice data.

According to this embodiment, since the situation words that indicate the speaker's mental state or emotions can be automatically reproduced corresponding to the situation before or after the statement voice data even if the player does not actually speak, a realistic scene can be produced without impairing the reality of the chat even if the voice of the actor is reproduced in place of the voice of the player.

Moreover, since a different sound filter process can be performed based on whether or not the sender and the destination of the statement belong to the same team, a special radio communication environment between the teams can be produced so that a more realistic scene can be produced.

Third Embodiment

A third embodiment to which the invention is applied is described below. This embodiment is basically configured in the same manner as the first embodiment or the second embodiment, but differs from the first embodiment or the second embodiment in that the target statement type classified into a hierarchical structure is selected by selecting the hierarchical structure by voice recognition without using the statement identification keyword 54. The following description focuses on only the features of this embodiment. The same elements as in the first embodiment or the second embodiment are indicated by the same symbols. Description of these elements is omitted.

In this embodiment, the player speaks the statement start keyword/sender identification keyword 50, the destination identification keyword 52, the statement identification keyword 54, and the statement completion keyword/transmission permission keyword 56 in this order in the same manner as in the first embodiment.

In this embodiment, however, the statement type is classified and stored in a hierarchical structure, and the input voice text obtained by recognizing the statement of the player is compared with each hierarchically classified keyword. A process of sequentially selecting the classification is repeated to specify one statement type. Therefore, the statement identification keyword 54 according to this embodiment changes corresponding to the number of hierarchical levels and the storage position of the target statement type.

Figure 29:
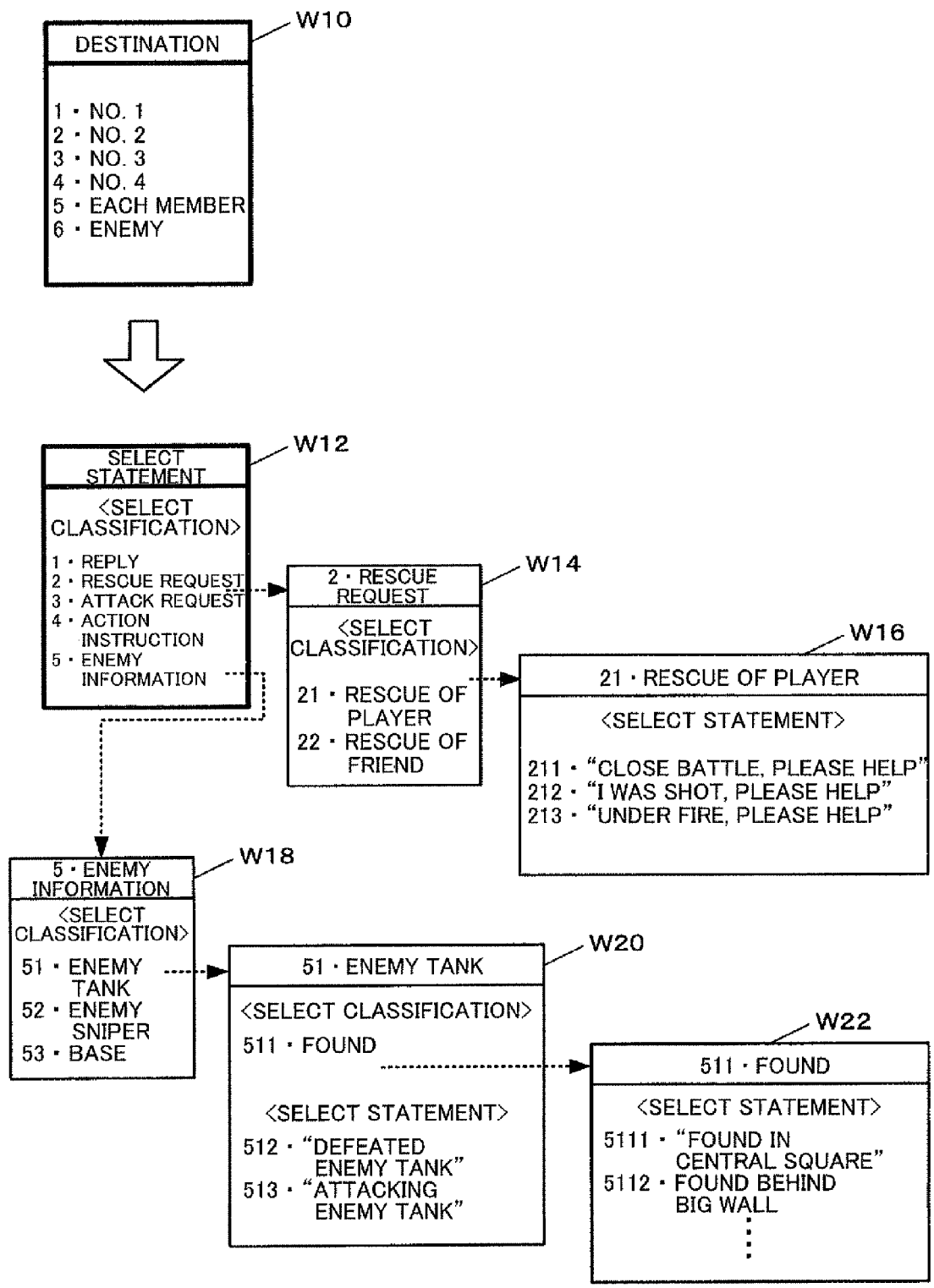
FIG. 29 is a view showing an example of a pop-up window according to a third embodiment that is displayed in a game screen upon selection of a statement type.

FIG. 29 is a view showing an example of a pop-up window displayed in the game screen along with selection of the statement type. A broken arrow shows the relationship the classification selected at a higher level and an example of a sub-pop-up window that is displayed when the classification has been selected.

When the statement start keyword/sender identification keyword 50 has been input, a pop-up window W10 is displayed in the game screen. A plurality of classifications that correspond to the destination in the first embodiment and the second embodiment are displayed in the pop-up window W10. One classification is formed by the number and the name of the destination that indicate the keyword for selecting the classification.

When the player has spoken the number or the name of the classification displayed in the pop-up window W10 into the microphone 1372 after the statement start keyword/sender identification keyword 50, the corresponding classification is automatically selected by voice recognition, and a pop-up window W12 is displayed in place of the pop-up window W10.

The pop-up window W12 and subsequently displayed pop-up windows are used to select a specific statement type.

In this embodiment, classifications "1. Reply", "2. Rescue request", "3. Attack request", "4. Action instruction", and "5. Enemy information" are in the pop-up window W12 (i.e., selection support screen). The number and the name of each classification are displayed. Each classification in the first level corresponds to each statement set in the first embodiment. Each classification is automatically selected and displayed corresponding to the game state in the same manner as in the first embodiment.

When the player has spoken the number or the name of the classification corresponding to the desired statement into the microphone 1372 while watching the pop-up window W12, the keyword is recognized so that the corresponding classification is automatically selected. A sub-window that shows classifications at the selected lower level is then displayed.

In the example shown in FIG. 29, classifications "21. Rescue of player" and "22. Rescue of friend" are set as the second level of the first-level classification "2. Rescue request". When the player has spoken "2" or "Rescue request" while watching the pop-up window W12, the classification "2. Rescue request" is selected, and a sub-window W14 is displayed in addition to the pop-up window W12. The number and the name of each of the classifications "21. Rescue of player" and "22. Rescue of friend" are displayed in the sub-window W14.

Specific statement types "211. Close battle, please help", "212. I was shot, please help", and "213. Under fire, please help" are set as the third level lower than the second-level classification "21. Rescue of player".

When the player has spoken "21" or "Rescue of player" while watching the sub-window W14, the classification "21. Rescue of player" is selected, and a sub-window W16 that shows the third level is additionally displayed. When the player has spoken the number or the statement of one of the classifications into the microphone 1372 while watching the sub-window W16, the transmission target statement type is selected.

As another hierarchical structure and display example, when the player has selected the first-level classification "5. Enemy information", a sub-window W18 that shows second-level classifications "51. Enemy tank", "52. Enemy sniper", and "53. Base" is displayed. When the player has selected the second-level classification "51. Enemy tank", a sub-window W20 that shows a third-level classification "511. Found" and statement types "512. Defeated enemy tank" and "513. Attacking enemy tank" is displayed. When the player has selected the third-level classification "511. Found", a sub-window W22 that shows fourth-level statement types "5111. Found in central square" and "5112. Found behind big wall" is displayed. Note that other classifications similarly have lower levels until the statement type is reached. The player reaches statement types appropriate for various conditions.

In this embodiment, the player can reach the desired statement type by sequentially reading the keyword displayed in the selection support screen (pop-up window) into the microphone 1372.

In order to select the statement type classified into such a hierarchical structure by voice recognition, the storage section 500 according to this embodiment stores a destination voice library 520-3 in place of the destination voice library 520 according to the first embodiment, and stores a statement set selection condition TBL 524-3 in place of the statement set selection TBL 524 according to the first embodiment. The storage section 500 stores a statement set 527-3 in place of the statement set 527 according to the first embodiment.

Figure 30:
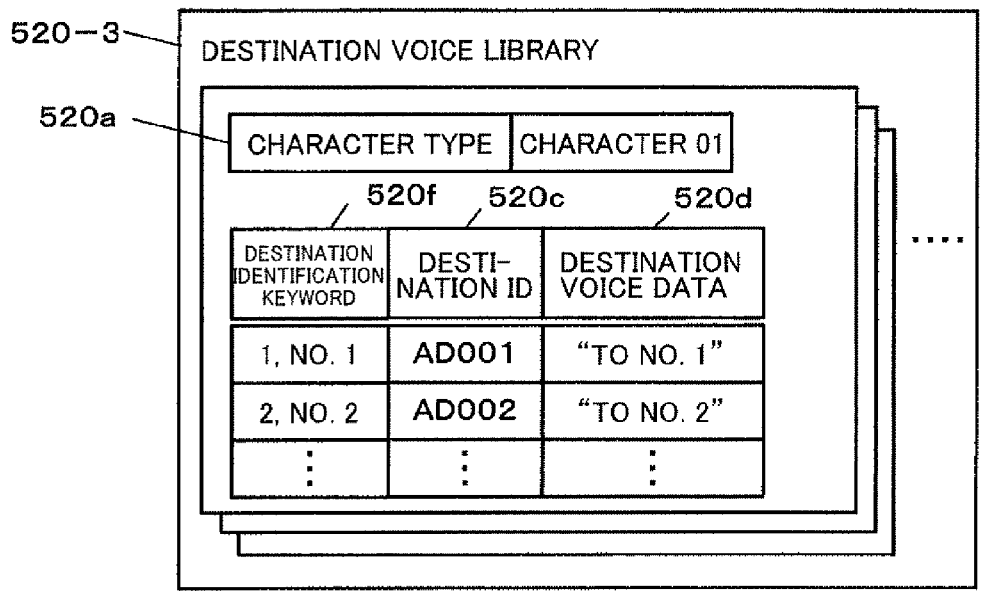
FIG. 30 is a view showing a data configuration example of a destination voice library according to a third embodiment.

As shown in FIG. 30, the destination voice library 520-3 stores a destination identification keyword 520f, a destination ID 520c, and destination voice data 520d corresponding to each character type 520a, for example. The name and the number of the player's character that indicate the destination of the statement are set as the destination identification keyword 520f.

Figure 31:
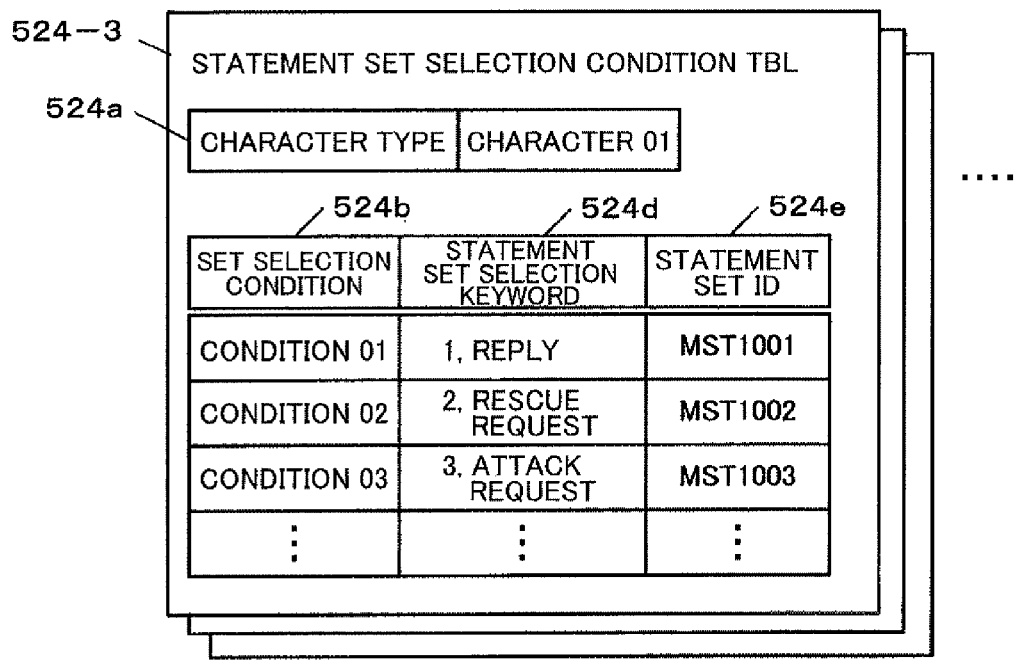
FIG. 31 is a view showing a data configuration example of a statement set selection condition TBL according to a third embodiment.

As shown in FIG. 31, the statement set selection condition TBL 524-3 is provided corresponding to each character type 524a, and stores a set selection condition 524b, a statement set selection keyword 524d, and a statement set ID 524e, for example. The set selection condition 524b is that same as that of the first embodiment. The statement set selection keyword 524d is compared with the input voice text obtained by voice recognition. In this embodiment, the number and the name are set as the statement set selection keyword 524d.

FIG. 32 is a view showing a data configuration example of the statement set 527-3 according to this embodiment. As shown in FIG. 32, a classification selection keyword corresponding to each level (second hierarchical classification selection keyword 527j, third hierarchical classification selection keyword 527k, . . . and nth-level hierarchical classification selection keyword 527m), a statement ID 527d, statement voice data 527e, and a log display text 527g are stored as the statement set 527-3 corresponding to each statement set ID 527a.

The hierarchical classification selection keyword is compared with the input voice text obtained by voice recognition during selection of the level or the statement type. The hierarchical classification selection keyword serves as a text that displays the number and the name of the classification when displaying a sub-window or a text that displays the number and the statement. In the statement set 527-3, the hierarchical classification selection keyword at the lowest level corresponds to the statement identification keyword according to the first embodiment.

Figure 33:
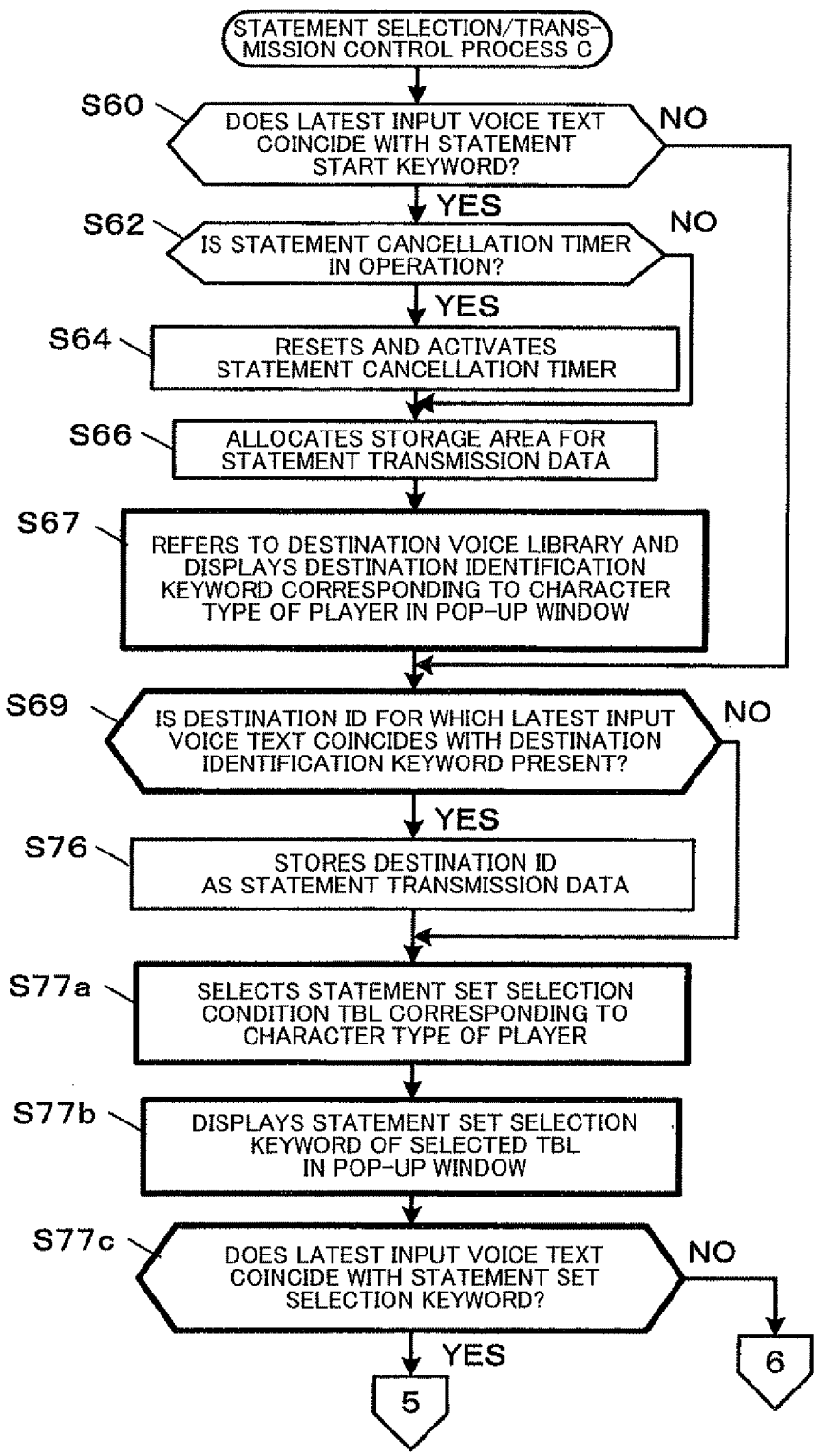
FIG. 33 is a flowchart illustrative of the flow of a statement selection/transmission control process (statement selection/transmission control process C) according to a third embodiment.
Figure 34:
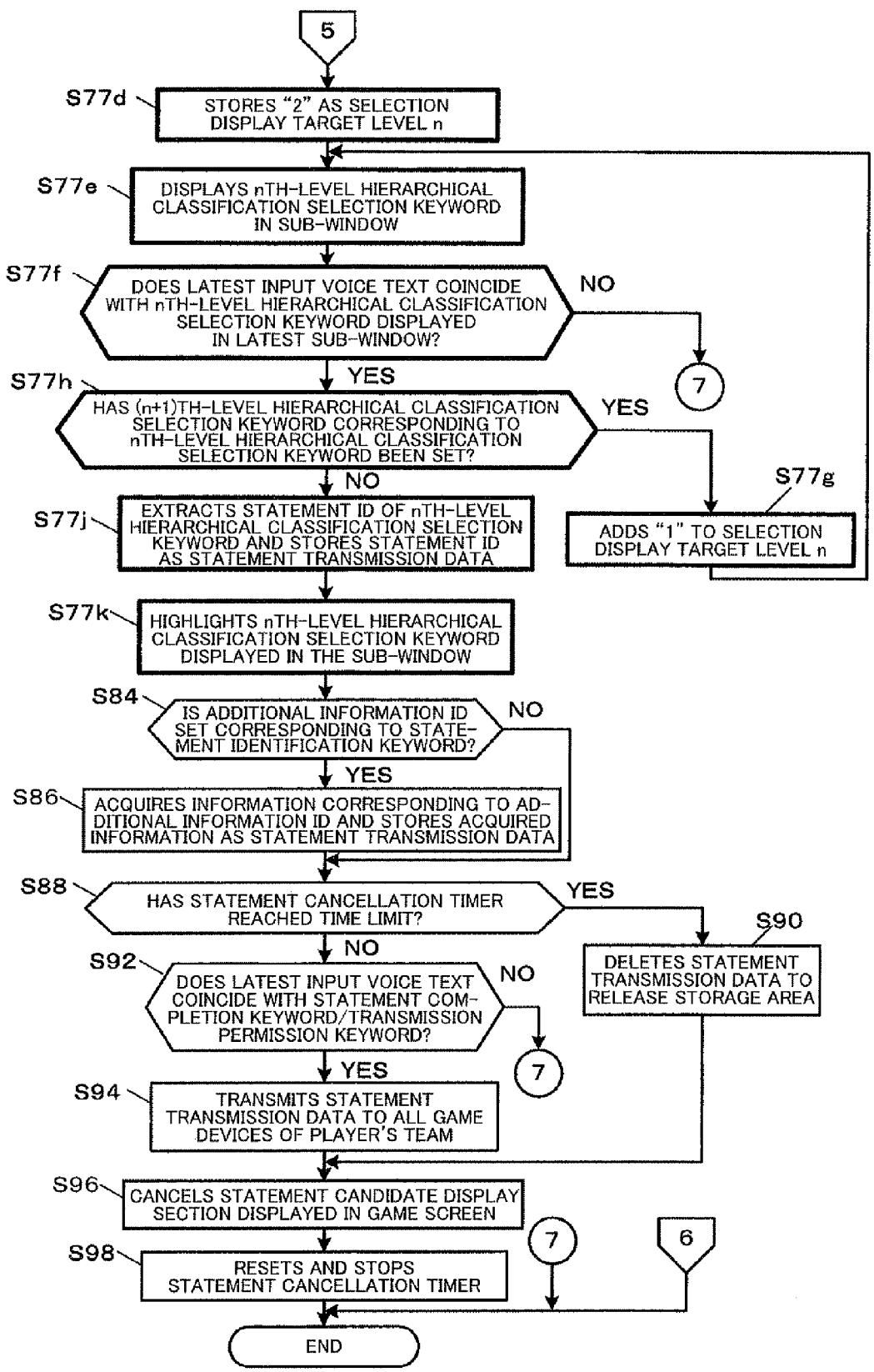
FIG. 34 is a flowchart illustrative of the flow of a statement selection/transmission control process (statement selection/transmission control process C) according to a third embodiment.

FIGS. 33 and 34 are flowcharts illustrative of the flow of the statement selection/transmission control process (statement selection/transmission control process C) according to this embodiment.

The flow of the statement selection/transmission control process C is basically that same as that of the statement selection/transmission control process according to the first embodiment. In the statement selection/transmission control process C, when the processing section 200 has allocated the storage area of the statement transmission data 552 (step S66), the processing section 200 refers to the destination voice library 520-3, and displays the destination identification keyword 520f corresponding to the character type 148 of the player in the pop-up window W10 (see FIG. 29) (step S67).

The processing section 200 then refers to the input voice text history 550, compares the latest input voice text with the destination identification keyword 520b corresponding to the character type 148 of the player, and determines the presence or absence of the destination ID 520c with which the destination identification keyword 520b coincides (step S69). When the destination ID 520c is present (YES in step S69), the processing section 200 stores the destination ID 520c as the destination ID 552a stored as the statement transmission data 552 (step S76).

The processing section 200 selects the statement set selection condition TBL 524-3 corresponding to the character type 148 of the player (step S77a), and displays the statement set selection keyword 524d of the selected statement set selection condition TBL 524-3 in the pop-up window W12 (step S77*b*). The processing section 200 then refers to the input voice text history 550, and determines whether or not the latest input voice text coincides with the statement set selection keyword 524*d* displayed in the pop-up window W12 (step S77*c*).

When the latest input voice text coincides with the statement set selection keyword 524*d* displayed in the pop-up window W12 (YES in step S77*c*), the processing section 200 stores "2" in the storage section 500 as the selection display target level n (step S77*d*), refers to the corresponding statement set 527-3, and displays the nth-level hierarchical classification selection keyword in the sub-window (step S77*e*).

The processing section 200 then refers to the input voice text history 550. The processing section 200 compares the latest input voice text with the nth-level hierarchical classification selection keyword displayed in the latest sub-window (step S77*f*).

When the latest input voice text coincides with the nth-level hierarchical classification selection keyword (YES in step S77*f*), the processing section 200 refers to the statement set 527-3, and determines whether or not the (n+1)th-level hierarchical classification selection keyword at the lower level of the nth-level hierarchical classification selection keyword has been set (step S77*h*).

When the (n+1)th-level hierarchical classification selection keyword has been set (YES in step S77*h*), the processing section 200 adds "1" to the selection display target level n (step S77*g*), and transitions to the step S77*e*. Specifically, the processing section 200 displays the nth-level hierarchical classification selection keyword at the next level in the sub-window, and prompts selection by the player.

When the (n+1)th-level hierarchical classification selection keyword has not been set (NO in step S77*h*), the processing section 200 determines that the nth-level hierarchical classification selection keyword is the lowest level and corresponds to the statement identification keyword, stores the statement ID 527*d* of the nth-level hierarchical classification selection keyword as the statement transmission data 552 (step S77*j*), and highlights the nth-level hierarchical classification selection keyword displayed in the sub-window (step S77*k*). One statement is thus temporarily selected. The subsequent process is the same as in the first embodiment.

In this embodiment, the statement transmission data 552 is transmitted to the other game devices of the player's team in the same manner as in the first embodiment. Note that the statement transmission data 552 may be selectively transmitted to the game device of another player's character set by the destination ID 552*a* in the same manner as in the second embodiment.

In this embodiment, the hierarchical classification of the statement type is sequentially selected from the higher level to the lower level. Note that a specific number may be assigned to each statement type. The steps S77*d* to S77*j* may be omitted when the specific number has been recognized by voice recognition in the step S77*b* or the subsequent step, and the statement ID 527*d* corresponding to the recognized number may be stored as the statement transmission data 552. In this case, if the player can memorize the number of the frequently used statement type during game play, the player can quickly select the desired statement type without waiting for the hierarchical display.

Fourth Embodiment

A fourth embodiment to which the invention is applied is described below. This embodiment is basically implemented in the same manner as the first to third embodiments, but differs from the first to third embodiments in that the statement transmission data includes speaker's voice data and the game device that has received the statement transmission data can implement the process that specifies the statement type by voice recognition.

The following description focuses on the difference from the first to third embodiments based on the first embodiment. The same elements as the elements according to the first to third embodiments are indicated by identical symbols. Description of these elements is omitted.

Figure 35:
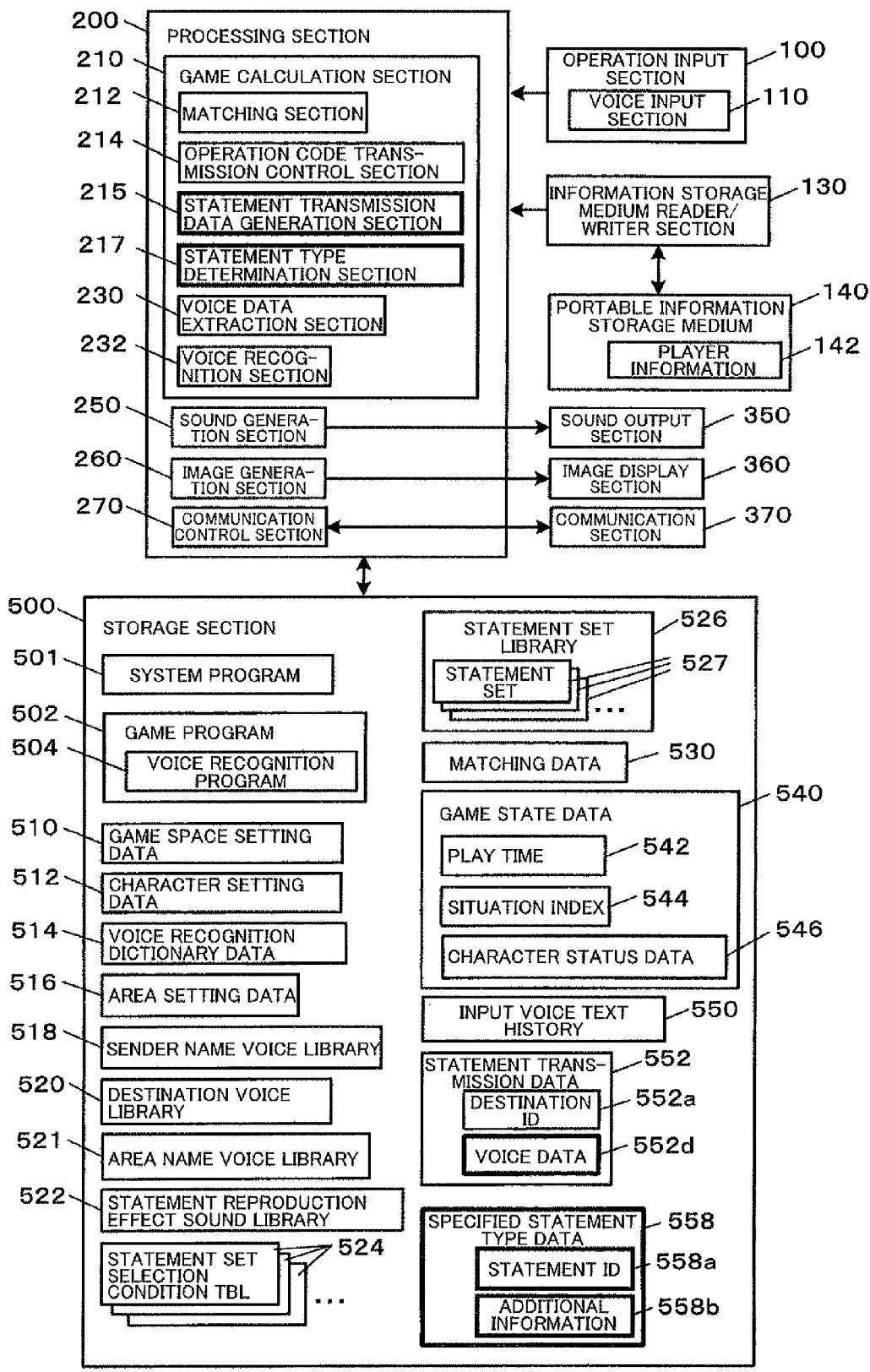
FIG. 35 is a functional block diagram showing a configuration example of functional blocks according to a fourth embodiment.

FIG. 35 is a view showing a configuration example of functional blocks according to this embodiment. In this embodiment, the game calculation section 210 of the processing section 200 includes a statement transmission data generation section 215 and a statement type determination section 217.

The statement transmission data generation section 215 corresponds to the statement selection/transmission control section according to the first embodiment. The statement transmission data generation section 215 implements a function of selecting and displaying the candidate display text 61 displayed in the statement candidate display section 60 of the game screen, a function of recognizing the voice of the player input from the voice input section 110 and determining the sender of the chat statement, and a function of generating vocal data of the voice of the player. Therefore, the statement transmission data 552 according to this embodiment includes a destination ID 552*a* and vocal data 552*d*. The voice data may be generated by appropriately utilizing known voice data generation technology used for a voice chat.

The statement type determination section 217 implements a function of performing a voice recognition process on the vocal data 552*d* included in the statement transmission data 552 received from another game device and specifying the statement type corresponding to the statement of the sender player, and a function of acquiring additional information when the additional information is added to the specified statement type.

As the specified information, a statement ID 558*a* and additional information 558*b* are temporarily stored in the storage section 500 as specified statement type data 558.

FIG. 36 is a view showing a data configuration example of the statement set 527-4 according to this embodiment for which the additional information is set. In this embodiment, the game device that has received the statement transmission data specifies the statement type. In the first embodiment, information (IF01 (player's position) in FIG. 18) that indicates the position of the player's character of the game device as the sender is set as the additional information 527*h*. In this embodiment, information (IF11 (sender position) in FIG. 36) that indicates the position of the player's character of another game device as the sender must be set as the additional information 527*h*.

Figure 37:
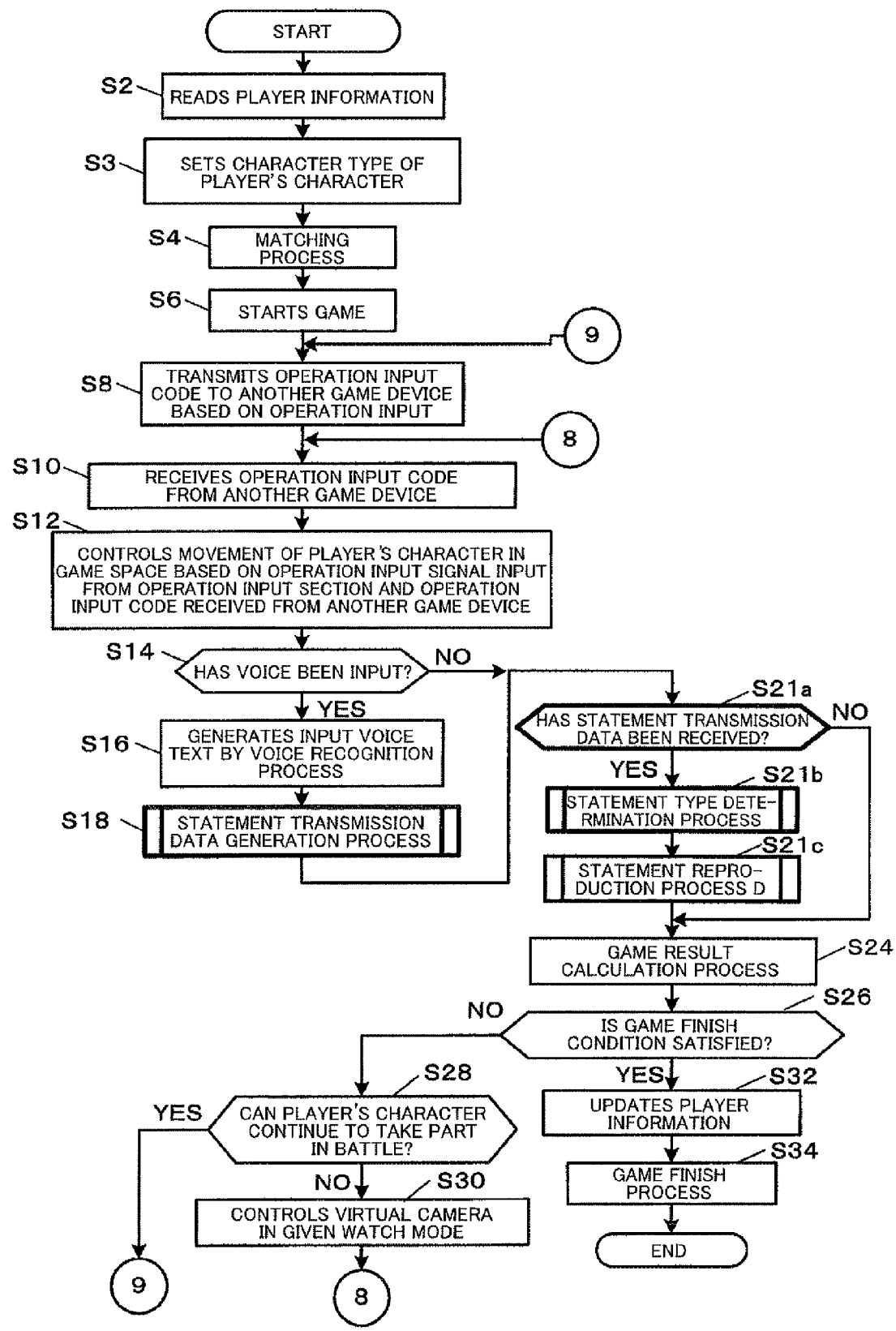
FIG. 37 is a flowchart illustrative of the flow of a process executed by each arcade game device according to a fourth embodiment.

FIG. 37 is a flowchart illustrative of the flow of a process executed by each arcade game device 1300 according to this embodiment. In this embodiment, when the processing section 200 has detected that a voice has been input from the voice input section 110 (YES in step S14), the processing section 200 recognizes the input voice to generate an input voice text, and stores the input voice text in the input voice text history 550 (step S16). The processing section 200 then executes a statement transmission data generation process instead of the statement selection/transmission control process according to the first embodiment (step S18).

Figure 38:
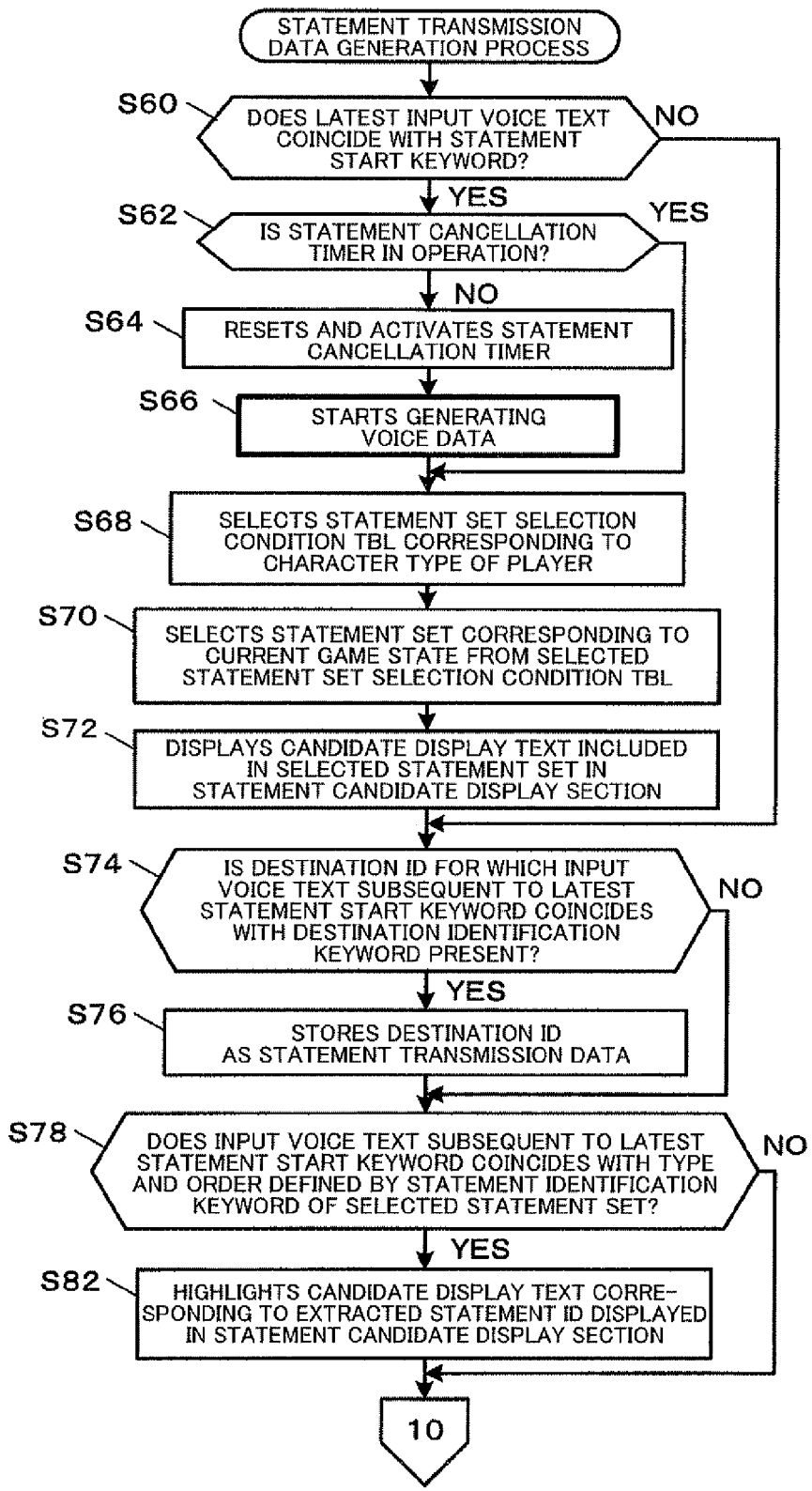
FIG. 38 is a flowchart illustrative of the flow of a statement transmission data generation process according to a fourth embodiment.
Figure 39:
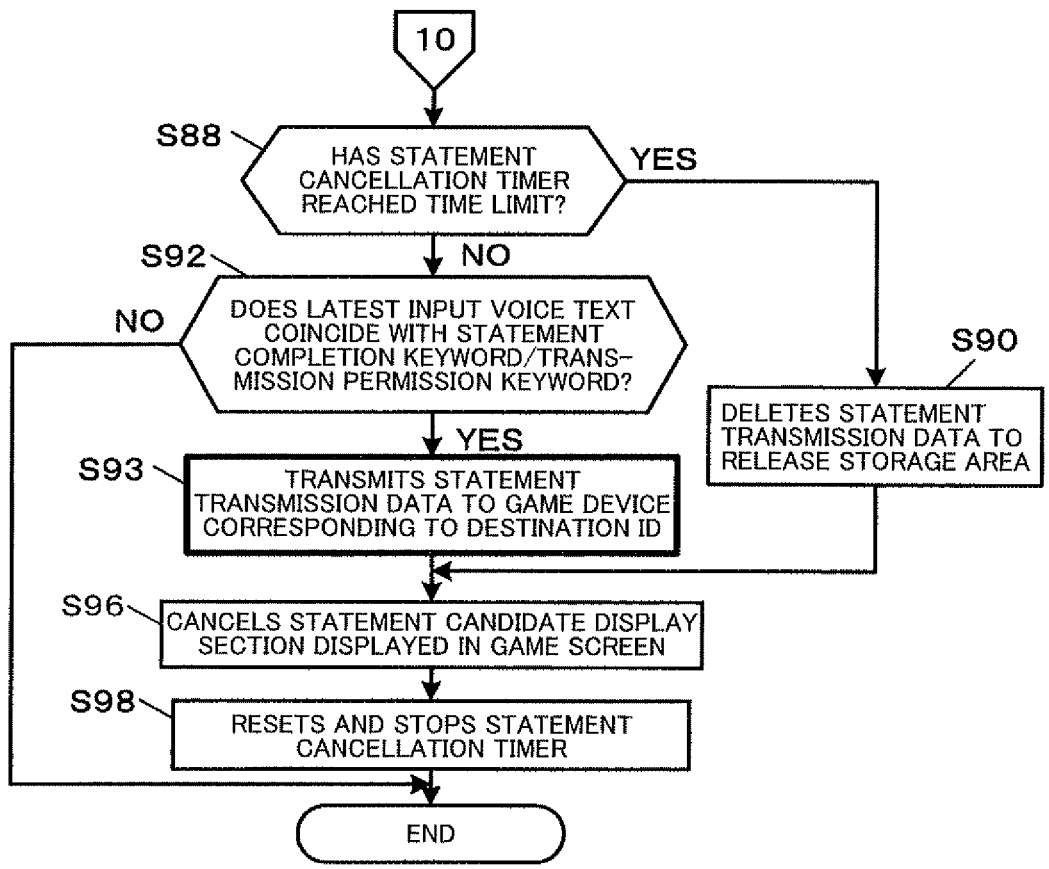
FIG. 39 is a flowchart illustrative of the flow of a statement transmission data generation process according to a fourth embodiment.

FIGS. 38 and 39 are flowcharts illustrative of the flow of the statement transmission data generation process according to this embodiment. The flow of the statement transmission data generation process is basically the same as that of the statement selection/transmission control process.

As a first feature, when the statement cancellation timer is not in operation (NO in step S62), the processing section 200 resets and activates the statement cancellation timer (step S64), and starts generating the voice data 552d (step S66).

As a second feature, the process relating to the additional information ID (steps S84 to S86) in the statement transmission data generation selection transmission control process according to the first embodiment is omitted.

As a third feature, when the latest input voice text coincides with the statement completion keyword/transmission permission keyword 56 (step S92), the processing section 200 transmits the statement transmission data 552 to another game device corresponding to the destination ID 552a specified in the steps S74 to S76 (step S93).

Again referring to the flowchart shown in FIG. 37, when the processing section 200 has not detected that a voice has been input from the voice input section 110 (NO in step S14), or when the processing section 200 has received the statement transmission data from another game device after executing the statement transmission data generation process (YES in step S21a), the processing section 200 sequentially executes a statement type determination process (step S21b) and a statement reproduction process D (step S21c).

Figure 40:
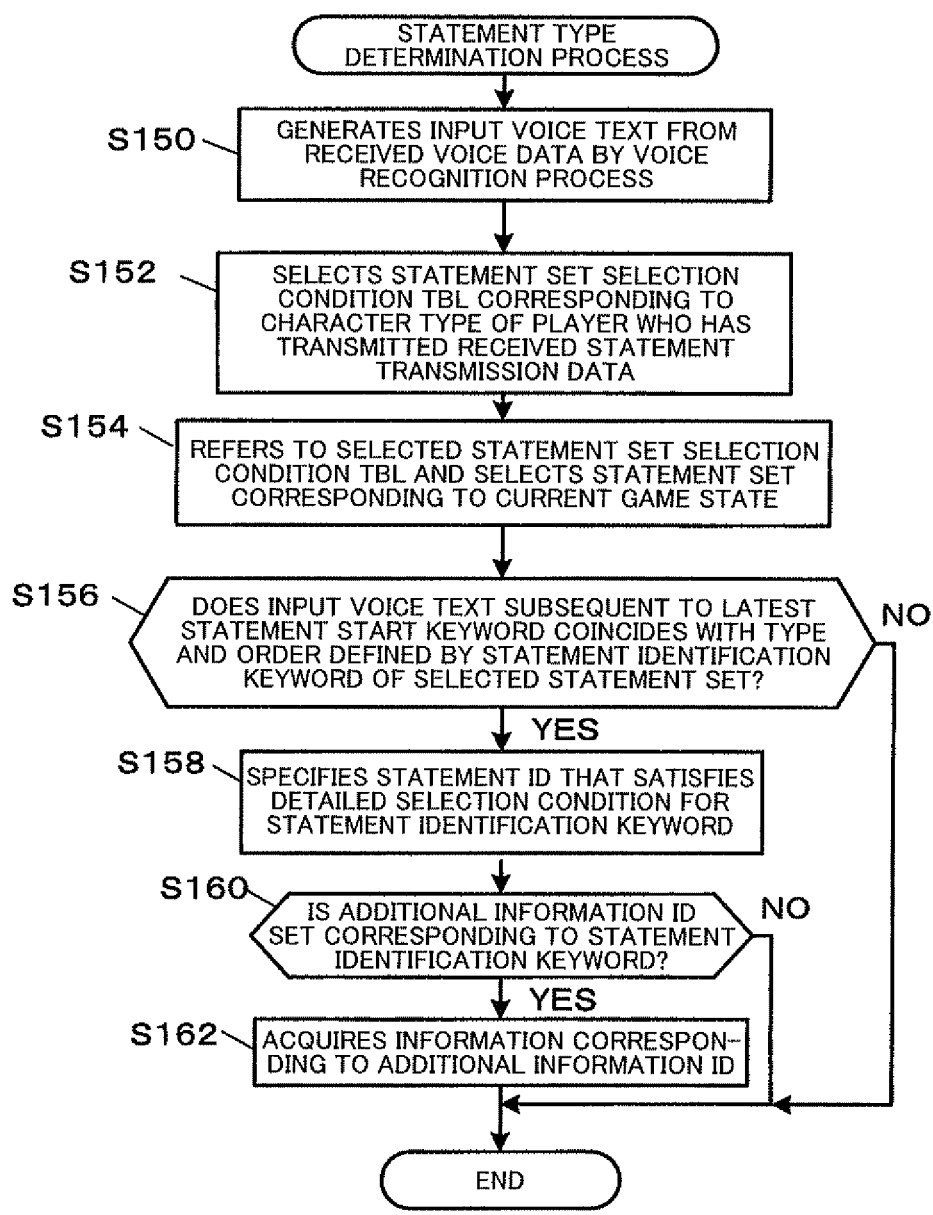
FIG. 40 is a flowchart illustrative of the flow of a statement type determination process.

FIG. 40 is a flowchart illustrative of the flow of the statement type determination process. In the statement type determination process, the processing section 200 executes the voice recognition processes on the voice data 552d included in the received statement transmission data 552 to generate an input voice text from the voice data (step S150).

The processing section 200 then refers to the matching data 530, acquires the character type 530f of the player's character of the player who is the sender of the received statement transmission data, and selects the statement set selection condition TBL 524 corresponding to the acquired character type 530f (step S152).

The processing section 200 refers to the selected statement set selection condition TBL 524, and selects the statement set 527 corresponding to the current game state from the statement set library 526 (step S154). In this case, the processing section 200 selects all of the statement sets that satisfy the set selection condition 524b of the statement set selection condition TBL 524.

The processing section 200 then refers to the input voice text history 550, extracts the input voice text stored subsequent to the latest statement start keyword/sender identification keyword 50 and the destination identification keyword 52, and compares the input voice text with the keyword defined by the statement identification keyword 527b of the statement set 527 selected in the step S154 and the order condition (step S156).

When the input voice text coincides with the statement identification keyword 527b (YES in step S156), the processing section 200 refers to the detailed selection condition 527c corresponding to the statement identification keyword 527b, extracts the statement ID 527d that satisfies the detailed selection condition 527c, and stores the statement ID 558a as the specified statement type data 558 (step S158).

When the additional information ID 527h is set for the statement identification keyword 527b determined in the step S156 in the statement set 527 selected in the step S154 (YES in step S160), the processing section 200 acquires information corresponding to the setting of the additional information ID 527h, stores the information in the specified statement type data 558 as the additional information 558b (step S162), and finishes the statement type determination process. The processing section 200 omits the step S162 when the additional information ID 527h is not set, and finishes the statement type determination process.

FIG. 41 is a flowchart illustrative of the flow of the statement reproduction process D. In the statement reproduction process D, the processing section 200 refers to the sender name voice library 518, extracts the sender name voice data 518c (e.g., "This is No. 3") corresponding to the sender identification data 518a (step S102), refers to the destination voice library 520, and extracts the destination voice data 520d (e.g., "To No. 2") that coincides with the destination ID 552a included in the received statement transmission data 552 (step S104).

The processing section 200 then refers to the statement set library 526, instead of the step S106 according to the first embodiment, and extracts the statement voice data 527e corresponding to the specified statement ID 558a (step S105). Since the statement ID 558b specified in the step S158 is selected from the statement sets 527 that is likely to be stated by the sender player's character under the situation based on the statement set selection condition TBL 524 corresponding to the type of the sender player's character, the statement voice data 527e indicates the voice of the actor corresponding to the sender player's character.

When the additional information 558b is included in the specified statement type data 558 (YES in step S107), the processing section 200 extracts the voice data that indicates (reads out) the additional information 558b (step S109) instead of the steps S108 and S110 according to the first embodiment.

In this embodiment, the current position coordinates of the player's character, another player's character, or the like are stored as the additional information 558b. When the additional information 558b indicates position coordinates, the processing section 200 refers to the area setting data 516, and acquires the area ID 516b of the area 16 that corresponds to the position coordinates indicated by the additional information 558b. The processing section 200 then extracts the area name voice data 521c that corresponds to the character type of the sender and corresponds to the acquired area ID from the area name voice library 521 (see FIG. 13).

Note that a number, a direction, or the like may be set as the additional information 558b. In this case, a voice library similar to the area name voice library 521 may be provided corresponding to each parameter, and the voice data of the actor corresponding to the character type of the sender may be selected from the voice library corresponding to the type of information stored as the additional information 558b.

When the processing section 200 has extracted the voice data (sender name voice data, destination voice data, statement voice data, and area name voice data according to circumstances) corresponding to the statement transmission data 552, the processing section 200 executes the process in the same manner as the statement reproduction process according to the first embodiment, outputs the extracted voice data from the sound output section 350, and finishes the statement reproduction process.

Modification

The first to fourth embodiments to which the invention is applied have been described above. Note that the invention is not limited thereto. Various modifications may be appropriately made, such as changing some of the elements, adding other elements, or omitting some of the elements.

For example, the above embodiments illustrate an example in which the arcade game device 1300 is used as an example of the computer device. Note that a consumer game device, a portable game device, a personal computer, a portable telephone, or the like that has a network communication function (particularly compliant with an online multi-player game) may be used.

The above embodiments illustrate an example in which the start and the end of a statement are determined by voice recognition. Note that a special button switch may be assigned to a statement, and the player may make a statement by pressing the switch.

The above embodiments illustrate an example in which the detailed selection condition 527c of the statement set 527 (see FIGS. 16 and 17) utilizes the information included in the play record as the parameter. Note that a character setting (e.g., the difference in sex between the sender player's character and the destination player's character, the difference in virtual rank in the game, a love relationship, a blood relationship, or friendship) may also be utilized.

Although only some embodiments of the invention have been described in detail above, those skilled in the art would readily appreciate that many modifications are possible in the embodiments without materially departing from the novel teachings and advantages of the invention. Accordingly, such modifications are intended to be included within the scope of the invention.

What is claimed is:

1. A system that implements voice chat communication via transmission of keyword identification information, the system comprising:
a first computer device comprising:
a first display screen;
a first microphone;
a first speaker; and
a first processor configured to:
receive, via the first microphone, first voice data;
recognize a first keyword or phrase in the received first voice data that corresponds to a stored start keyword or phrase;
automatically select, based on a game state, appropriate statement type candidates from a plurality of stored sets of statement types that differ in category and are registered in advance;
control the first display screen to display a plurality of statement keywords corresponding to the selected statement type candidates;
receive, via the first microphone, second voice data;
recognize in the second voice data: (1) a destination identification (ID) keyword or phrase, and (2) a statement identification (ID) keyword or phrase corresponding to one of the displayed statement keywords;
determine a destination ID that corresponds to the recognized destination ID keyword, and a statement ID that corresponds to the recognized statement ID keyword; and
transmit the determined destination ID and the determined statement ID to a second computer device; and
the second computer device comprising:
a second display screen;
a second microphone;
a second speaker; and
a second processor configured to:
receive the transmitted destination ID and the transmitted statement ID from the first computer device;
extract third voice data of a statement that corresponds to the received destination ID and the received statement ID from predetermined voice data stored in advance; and
control the second speaker to output a reproduced voice corresponding to the extracted third voice data.

2. The method as defined in claim 1, wherein
the outputting of the sound includes outputting situation voice data, and
the situation voice data is determined in advance corresponding to the game state.

3. A method of executing an online multiplayer game and implementing voice chat communication via transmission of keyword identification information between a first player who operates a first computer device and a second player who operates a second computer device, the method comprising:
receiving, by a first microphone of the first computer device, first voice data;
recognizing, by a first processor of the first computer device, a first keyword or phrase in the received first voice data that corresponds to a stored start keyword or phrase;
after the first keyword or phrase is recognized to correspond to the stored start keyword or phrase:
automatically selecting, by the first processor, based on a game state, appropriate statement type candidates from a plurality of stored sets of statement types that differ in category and that are registered in advance;
displaying, via a display screen of the first computer device, a plurality of statement keywords corresponding to the selected statement type candidates;
receiving, via the first microphone, second voice data;
recognizing, by the first processor: (1) a destination identification (ID) keyword or phrase, and (2) a statement identification (ID) keyword or phrase in the received second voice data;
determining, by the first processor, a destination ID that corresponds to the recognized destination ID keyword or phrase, and a statement ID that corresponds to the recognized statement ID keyword or phrase;
transmitting, by the first processor, the determined destination ID and the determined statement ID to the second computer device;
receiving, by a second processor of the second computer device, the transmitted destination ID and the transmitted statement ID from the first computer device;
extracting, by the second processor, third voice data of a player statement that corresponds to the transmitted statement ID and the transmitted destination ID from predetermined actor voice data stored in advance, thereby forming an actor voice statement that excludes portions of the player statement, the predetermined actor voice data being provided in advance corresponding to each player, an actor doing a game character voice for at least one of the players; and
audibly outputting, via the second processor controlling a speaker of the second computer device, a sound based on the extracted specific voice data.

4. The method as defined in claim 3, further comprising:
recognizing (1) the destination identification (ID) keyword, and (2) the statement identification (ID) keyword in the received second voice data and an order of the keywords, and
determining a statement type based at least in part on the order of the keywords.

5. The method as defined in claim 3, further comprising:
extracting effect sound data that corresponds to the second player from effect sound data that has been defined in advance corresponding to each player, wherein the audibly outputting includes audibly outputting a synthetic reproduction of the extracted effect sound data that corresponds to the second player.

6. The method as defined in claim 3, wherein
the game is configured to host a plurality of groups to play a match, each of the plurality of groups being formed by a plurality of players; and
the audibly outputting of the sound is based on whether the first player and the second player belong to different groups.

7. A method of implementing voice chat communication via transmission of keyword identification information between a first user who operates a first computer device and a second user who operates a second computer device, the method comprising:
receiving, by a microphone of the first computer device, first voice data;
recognizing, by a first processor of the first computer device, a first keyword or phrase in the received first voice data that corresponds to a stored start keyword or phrase;
automatically selecting, by the first processor, based on a game state, appropriate statement type candidates from a plurality of stored sets of statement types that differ in category and are registered in advance;
displaying, via a display screen of the first computer device, a plurality of statement keywords corresponding to the selected statement type candidates;
receiving, via the first microphone, second voice data;
recognizing, by the first processor, in the second voice data: (1) a destination identification (ID) keyword or phrase, and (2) a statement identification (ID) keyword or phrase corresponding to one of the displayed statement keywords;
determining, by the first processor, a destination ID that corresponds to the recognized destination ID keyword or phrase, and a statement ID that corresponds to the recognized statement ID keyword or phrase;
transmitting, by the first processor, the determined destination ID and the determined statement ID to the second computer device;
receiving, by a second processor of the second computer device, the transmitted destination ID and the transmitted statement ID from the first computer device;
extracting third voice data of a statement that corresponds to the received destination ID and the received statement ID from predetermined voice data stored in advance; and
controlling a speaker of the second computer device to output a reproduced sound corresponding to the extracted third voice data.

8. A non-transitory computer-readable storage medium storing a program that causes a computer to execute a method of implementing voice chat communication via transmission of keyword identification information between a first user who operates a first computer device and a second user who operates a second computer device, the method comprising:
receiving, by a microphone of the first computer device, first voice data;
recognizing, by a first processor of the first computer device, a first keyword or phrase in the received voice data that corresponds to a stored start keyword or phrase;
automatically selecting, by the first processor, based on a game state, appropriate statement type candidates from a plurality of stored sets of statement types that differ in category and that are registered in advance;
displaying, via a display screen of the first computer device, a plurality of statement keywords corresponding to the selected statement type candidates;
receiving, via the first microphone, second voice data;
recognizing, by the first processor, in the second voice data: (1) a destination identification (ID) keyword, and (2) a statement identification (ID) keyword corresponding to one of the displayed statement keywords;
determining, by the first processor, a destination ID that corresponds to the recognized destination ID keyword, and a statement ID that corresponds to the recognized statement ID keyword;
transmitting, by the first processor, the determined destination ID and the determined statement ID to the second computer device;
receiving, by a second processor of the second computer device, the transmitted destination ID and the transmitted statement ID from the first computer device;
extracting third voice data of a statement that corresponds to the received destination ID and the received statement ID from predetermined voice data stored in advance; and
controlling a speaker of the second computer device to output a reproduced sound corresponding to the extracted third voice data.

9. A first computer device that implements voice chat communication via transmission of keyword identification information, the first computer device comprising:
a display screen;
a microphone and a speaker; and
a processor configured to:
receive, via the microphone, first voice data;
recognize a first keyword or phrase in the received first voice data that corresponds to a stored start keyword or phrase;
automatically select appropriate statement type candidates from a plurality of stored statement types based on a game state;
control the display screen to display a plurality of statement keywords corresponding to the selected statement type candidates;
receive, via the microphone, second voice data;
recognize in the received second voice data: (1) a destination identification (ID) keyword or phrase, and (2) a statement identification (ID) keyword or phrase corresponding to one of the displayed statement keywords;
determine a destination ID that corresponds to the recognized destination ID keyword or phrase, and a statement ID that corresponds to the recognized statement ID keyword or phrase; and
transmit the determined destination ID and the determined statement ID to a second computer device.

10. A first computer device that executes an online multi-player game while implementing voice chat communication with a second computer device via transmission of keyword identification information, the first computer device comprising:
a display screen;
a chat headset that is configured to be worn on a head of a user, the first chat headset comprising a microphone and a headphone; and
a processor configured to:
receive, via the microphone, first voice data;
recognize a first keyword or phrase in the received first voice data that corresponds to a stored start keyword or phrase;

automatically select statement type candidates that are appropriate from a plurality of stored statement types based on a game state of the executing online multiplayer game;

control the display screen to display a plurality of statement keywords corresponding to the selected statement type candidates;

receive, via the microphone, second voice data;

recognize in the second voice data: (1) a destination identification (ID) keyword or phrase, and (2) a statement identification (ID) keyword or phrase corresponding to one of the displayed statement keywords;

determine a destination ID that corresponds to the recognized destination ID keyword or phrase, and a statement ID that corresponds to the recognized statement ID keyword or phrase; and transmit the determined destination ID and the determined statement ID to the second computer device.

11. A system that executes an online multiplayer game and that implements voice chat communication between a first player and a second player via transmission of keyword identification information, the system comprising:

a first computer device comprising:
  a first display screen;
  a first microphone;
  a first speaker; and
  a first processor configured to:
    receive, via the first microphone, first voice data;
    recognize a first keyword or phrase in the received first voice data that corresponds to a stored start keyword or phrase; and
    after the first start keyword or phrase is recognized to correspond to the stored start keyword or phrase:
      automatically select, based on a game state, appropriate statement type candidates from a plurality of stored sets of statement types that differ in category and are registered in advance;
      control the first display screen to display a plurality of statement keywords corresponding to the selected statement type candidates;
      receive, via the first microphone, second voice data;
      recognize in the received second voice data: (1) a destination identification (ID) keyword or phrase, and (2) a statement identification (ID) keyword or phrase;
      determine a destination ID that corresponds to the recognized destination ID keyword or phrase, and a statement ID that corresponds to the recognized statement ID keyword or phrase; and
      transmit the determined destination ID and the determined statement ID to a second computer device; and the second computer device comprising:
  a second display screen;
  a second microphone;
  a second speaker; and
  a second processor configured to:
    receive the transmitted destination ID and the transmitted statement ID from the first computer device;
    extract third voice data of a player statement that corresponds to the received destination ID and the received statement ID from predetermined actor voice data stored in advance, thereby forming an actor voice statement that excludes portions of the player statement, the predetermined actor voice data being provided in advance, an actor doing a game character voice for at least one of the players; and
    control the second speaker to audibly output a reproduced voice corresponding to the extracted third voice data.

* * * * *